US012597776B2

(12) United States Patent
Hossain et al.

(10) Patent No.: US 12,597,776 B2
(45) Date of Patent: Apr. 7, 2026

(54) ENERGY MANAGEMENT SYSTEM FOR A HIGH-VOLTAGE DIRECT CURRENT (HVDC) TRANSMISSION NETWORK

(71) Applicant: KING FAHD UNIVERSITY OF PETROLEUM AND MINERALS, Dhahran (SA)

(72) Inventors: Md Ismail Hossain, Dhahran (SA); Md Shafiullah, Dhahran (SA); Mohamed Ali Yousef Abido, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 153 days.

(21) Appl. No.: 18/425,733

(22) Filed: Jan. 29, 2024

(65) Prior Publication Data

US 2025/0246913 A1 Jul. 31, 2025

(51) Int. Cl.
|  |  |
|---|---|
| *H02J 3/36* | (2006.01) |
| *H02J 3/001* | (2026.01) |
| (Continued) | |

(52) U.S. Cl.
CPC ............... *H02J 3/36* (2013.01); *H02J 3/001* (2020.01); *H02J 3/32* (2013.01); *H02J 3/38* (2013.01);
(Continued)

(58) Field of Classification Search
CPC ...... H02J 3/36; H02J 3/001; H02J 3/32; H02J 3/38; H02J 2300/24; H02J 2300/28
See application file for complete search history.

(56) References Cited

U.S. PATENT DOCUMENTS

2023/0307921 A1* 9/2023 Zhang .................... H02J 3/381

FOREIGN PATENT DOCUMENTS

| CN | 109193766 B | 2/2021 |
|---|---|---|
| CN | 112398156 B | 6/2023 |
| CN | 116742682 A | 9/2023 |

OTHER PUBLICATIONS

Hossain, M. I., & Abido, M. A. (2020). Active Power Control of PV-Battery Connected MMC-HVDC System for FRT Support. Applied Sciences, 10(20), 7186. https://doi.org/10.3390/app10207186 (Year: 2020).*

(Continued)

*Primary Examiner* — Daniel Cavallari
(74) *Attorney, Agent, or Firm* — Oblon, McClelland, Maier & Neustadt, L.L.P.

(57) ABSTRACT

An energy management system for a high-voltage direct current (HVDC) transmission network includes a HVDC transmission line with first and second ends and a corresponding HVDC voltage. A first modular multilevel converter (MMC) is linked to the first end, interfaced with a first AC grid via a point of common coupling (PCC) that maintains a specific voltage. At the opposite end, a second MMC with its own voltage rating is connected, which in turn links to a second AC grid. This grid integrates renewable energy sources, comprising solar photovoltaic and wind farm systems, along with a battery energy storage system that includes a battery governed by a dedicated controller. The second PCC voltage is managed within the second AC grid. The system permits the second MMC to regulate the overall HVDC voltage, ensuring efficient energy distribution within the transmission network.

12 Claims, 19 Drawing Sheets

(51) Int. Cl.
 H02J 3/32 (2006.01)
 H02J 3/38 (2006.01)
(52) U.S. Cl.
 CPC ....... *H02J 2300/24* (2020.01); *H02J 2300/28*
 (2020.01)

(56) References Cited

OTHER PUBLICATIONS

Hossain, M. I., Shafiullah, M., & Abido, M. A. (2023). Battery Power Control Strategy for Intermittent Renewable Energy Integrated Modular Multilevel Converter-Based High-Voltage Direct Current Network. Sustainability, 15(3), 2626. https://doi.org/10.3390/su15032626 (Year: 2023).*

* cited by examiner

ENERGY MANAGEMENT SYSTEM FOR A HIGH-VOLTAGE DIRECT CURRENT (HVDC) TRANSMISSION NETWORK

STATEMENT REGARDING PRIOR DISCLOSURE BY THE INVENTORS

Aspects of this technology are described in an article "Battery Power Control Strategy for Intermittent Renewable Energy Integrated Modular Multilevel Converter-Based High-Voltage Direct Current Network", published in Sustainability, 2023, 15 (3), 2626 which is incorporated herein by reference in its entirety.

BACKGROUND

Technical Field

The present disclosure is directed to electrical energy systems, more particularly, to the energy management for Modular Multilevel Converters (MMC)-High Voltage Direct Current (HVDC) transmission network during faults on an Alternative Current (AC) side at the receiving end station.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The Modular Multilevel Converter High-Voltage Direct Current (MMC-HVDC) connection is a type of HVDC electric power transmission system. MMC is a type of converter technology used in HVDC systems and has several advantages over previous technologies such as thyristor-based converters. The MMC-HVDC is utilized for integrating Renewable Energy Resources (RER) into the electrical grid. The adoption of MMC-HVDC links is recognized for their scalability, modularity, and reduced physical footprint, facilitating the integration of RER with the existing AC grid infrastructure. Such integration supports grid stability by providing ancillary services, such as frequency regulation and dynamic voltage support.

Nevertheless, the fault ride-through (FRT) capabilities of MMC-HVDC networks pose significant challenges. During grid faults, the rapid reduction in active power output from onshore MMCs disrupts the power transmission capability of wind farms. This disruption often results in a swift rise in DC-link voltage due to the charging of associated capacitors. Current strategies to prevent DC-link overvoltage include the utilization of dynamic braking resistors and the rapid reduction of power output from wind farms. Such strategies, while effective in isolating faults and improving power transmission capacity, necessitate additional infrastructure, such as braking resistors and series transformers.

Communications-based de-loading control, voltage droop control, and frequency modulation have been explored as methods to rapidly reduce active power. Although these methods forego the need for additional offshore converter control, they introduce potential reliability and latency concerns due to their dependence on DC-link communication channels with wind turbines. The alternative approach of frequency modulation by adjusting the offshore grid frequency relative to DC voltage changes is hindered by the delayed active power response of wind farms, which is due in part to limited DF/DT tolerance. Voltage droop control strategies enable a swift reduction in wind farm active power, simplifying FRT for MMC-HVDC-connected offshore wind farms. Nonetheless, these may lead to notable DC overvoltage due to signal processing delays in filters and bandwidth constraints in the current management of wind turbines.

To maintain DC voltage within required levels, some solutions involve reducing offshore grid voltage to zero rapidly. This method, while sparing changes to wind turbine control, may cause synchronization challenges in phase-locked loop (PLL)-based turbine converters. Proposals for two-stage droop control to enhance FRT and post-fault recovery consider wind turbine inertia, which introduces delays to rapid power reduction, highlighting a challenge in controlling DC-link overvoltage.

RER is inherently intermittent, which complicates the alignment of energy supply with consumer demand. Energy Storage Systems (ESS), particularly battery ESS, are increasingly recognized as a means to mitigate this intermittency and promote the integration of RER into electrical grids. The demand for energy storage with high capacity and rapid response is growing, especially in large-scale applications involving diverse types of renewable generation. To moderate the fast transients caused by unpredictable changes in solar radiation, temperature, and wind speed, energy storage is being deployed in conjunction with renewable generation stations, enhancing their acceptability to utility companies.

Among the variety of ESS technologies, lithium-ion batteries have garnered significant attention due to their favorable energy density and longevity. Conversely, flywheel energy storage systems, which store excess energy as kinetic energy, can swiftly deliver substantial power to address low-voltage disturbances. However, the connection of flywheel storage to HVDC-links through separate MMCs involves substantial infrastructure costs similar to those associated with grid-connected converters. Supercapacitors, characterized by their high power density and rapid dynamic response, offer potential for fault ride-through assistance when paired with voltage source converter (VSC)-based HVDC links. Despite their capabilities, both flywheel and supercapacitor technologies are limited by their cost and energy losses, constraining their practical application.

Batteries have become the second most-installed ESS capacity globally, following pumped hydro storage, due to their high energy density and ability to retain a charge over extended periods. As battery costs have decreased, utilities are increasingly turning to BESS for applications such as power leveling, voltage and frequency management, and FRT support. The battery's size, however, dictates the duration over which it can offset the energy deficiency caused by RER intermittency.

Various configurations of battery-connected MMCs have been explored, ranging from cascaded centralized battery strings on the DC-link to integrated batteries connected with submodules of MMCs. Despite the progress, these configurations often encounter issues such as increased losses, voltage stress, and the necessity for bidirectional DC-DC converters. Moreover, simulations have not consistently considered the complete system dynamics nor the distributed nature of batteries in these systems.

Therefore, there is the need for a local voltage-based battery energy control scheme to manage surplus power in the HVDC-link during low-voltage faults on the AC side and to enhance transient performance in the face of RER intermittency.

Accordingly, it is one object of the present disclosure to provide methods and systems for a local voltage-based battery energy control scheme to manage surplus power in the HVDC-link during low-voltage faults on the AC side and to enhance transient performance in the face of RER intermittency.

SUMMARY

In an exemplary embodiment, an energy management system for a high-voltage direct current (HVDC) transmission network. The system includes a HVDC transmission line having a first end, a second end, and a HVDC voltage.

The system further includes a first modular multilevel converter (MMC) having a first MMC voltage connected to the first end of the HVDC transmission line, and a first AC grid having a first point of common coupling (PCC) connected to the first MMC. The first PCC has a first PCC voltage.

The system also includes a second MMC having a second MMC voltage connected to the second end of the HVDC transmission line, and a second AC grid having a second PCC connected to the second MMC. The second AC grid includes at least one solar photovoltaic system, at least one wind farm system, and a battery energy storage system including a battery and a battery controller, and a second PCC having a second PCC voltage. The second MMC is configured to regulate the HVDC voltage.

In one aspect of the embodiment, the battery controller is configured to sense a voltage disturbance of the energy management system and to switch a control mode between a normal operating mode and an excess energy control mode.

In one aspect of the embodiment, the battery controller is configured to operate in the normal operating mode; and wherein the second MMC voltage is about 1.0 pu and the HVDC voltage is about 2.0 pu.

In one aspect of the embodiment, the battery controller is configured to operate in the excess energy control mode during a three-phase-to-ground low-voltage fault at the first PCC by executing an energy control strategy. The energy control strategy includes changing the second MMC voltage from constant to variable. A variable second MMC voltage is proportional to the HVDC voltage in response to the three-phase-to-ground low-voltage fault. The three-phase-to-ground low-voltage fault causes the HVDC voltage to increase above a HVDC threshold voltage, signaling the battery controller by increasing the second PCC voltage in response to an increased second MMC voltage to switch the battery energy storage system from a discharging mode to a charging mode, and delivering an energy from the solar photovoltaic system and the wind farm system to the battery energy storage system to regulate HVDC voltage below the HVDC threshold voltage.

In one aspect of the embodiment, the HVDC voltage is greater than the HVDC threshold voltage and the variable second MMC voltage is a half of the HVDC voltage.

In one aspect of the embodiment, the HVDC threshold voltage is about 1.05 pu.

In one aspect of the embodiment, the first MMC and the second MMC each includes an inner current loop and an outer current loop. A first inner current loop of the first MMC is identical to a second inner current loop of the second MMC.

In one aspect of the embodiment, the first and second inner control loop is configured to produce a modulating signal according to the battery controller.

In one aspect of the embodiment, the energy management system excludes a dynamic breaking resistor.

In another exemplary embodiment, a method to control excess energy in an HVDC network is disclosed. The HVDC network includes a HVDC transmission line having a first end, a second end, and a HVDC voltage. The HVDC network further includes a first MMC having a first MMC voltage connected to the first end of the HVDC transmission line, and a first AC grid having a first PCC connected to the first MMC. The first PCC has a first PCC voltage, a second MMC configured to regulate the HVDC voltage and connected having a second MMC voltage to the second end of the HVDC transmission line, and a second AC grid having a second PCC connected to the second MMC. The second AC grid includes at least one solar photovoltaic system, at least one wind farm system, a battery energy storage system including a battery and a battery controller, and a second PCC having a second PCC voltage. The second PCC includes sensing a voltage disturbance at the first PCC to determine a three-phase-to-ground low-voltage fault and changing the second MMC voltage from constant to variable. A variable second MMC voltage is proportional to the HVDC voltage in response to the three-phase-to-ground low-voltage fault. The three-phase-to-ground low-voltage fault causes the HVDC voltage to increase above a HVDC threshold voltage. The second PCC further includes signaling the battery controller by increasing the second PCC voltage in response to an increased second MMC voltage to switch the battery energy storage system from a discharging mode to a mode, and delivering an energy from the solar photovoltaic system and the wind farm system to the battery energy storage system to regulate HVDC voltage below the HVDC threshold voltage.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
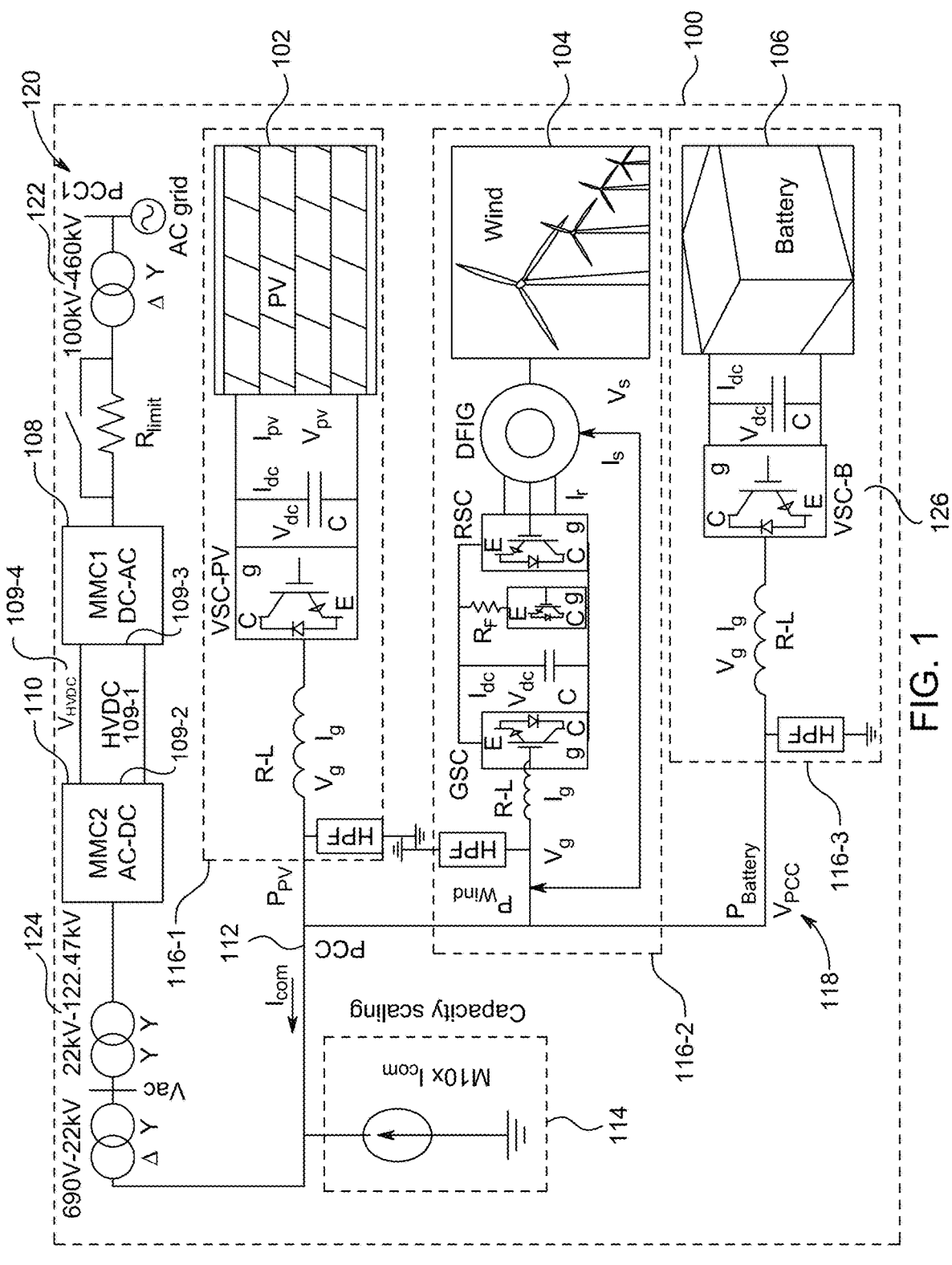
FIG. 1 illustrates a hybrid energy management system (100) having renewable energy sources and Modular Multilevel Converter MMC-High Voltage Direct Current HVDC system with energy storage, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Nomenclature:

Battery Side Converter:

R, L Reactor resistance and inductance

PCC Point of common coupling $\omega_0$ PCC angular frequency $i_{gd}$ & $i_{gq}$ PCC d-q axis current $V_{gd}$ & $V_{gq}$ PCC d-q axis voltage $V_d$ & $V_q$ VSC terminal d-q axis voltage C DC link capacitance VDC DC link voltage $I_{dc}$ DC link current VSC-B Battery side converter $I_{com}$ Combined current of PV, wind and battery $M_{10}$ Scaling factor HPF High pass filter ($L_F$+$R_F$/$C_F$)

BESS Battery energy storage system $P_{Battery}$ Battery power

MMC Converter:

R, L Arm reactor resistance and inductance,

PCC1 Point of common coupling of AC grid 1

$\omega_0$ Angular frequency at PCC1

$V_s$, $I_s$ 3-Ø voltage and current $V_{sd}$ & $V_{sq}$ d-q axis voltage of PCC1

$i_{sd}$ & $i_{sq}$ d-q axis current of PCC1

$V_d$ & $V_q$ MMC terminal d-q axis voltage,

VDC HVDC-link voltage $I_{ext}$ HVDC-link DC current

C Submodule capacitance $C_d$ DC link pole-to-pole capacitance

N Number of submodules $i_{d1}$ & $i_{q1}$ Negative sequence d-q axis current $V_{d1}$ & $V_{q1}$ Negative sequence d-q axis voltage, LG Single-line-to-ground LLG Double-line-to-ground LLLG Three-line-to-ground DBR Dynamic braking resistor MMC Modular multilevel converter HVDC High-voltage DC current Others:

PPV PV panel array power $P_{wind}$ Wind generator power

FRT Fault ride through $P_{Set}$ Combined power of wind generator and solar array RER Renewable energy resources CHIL Controller hardware in loop RTDS Real-time digital simulator FIG. 1 illustrates a hybrid energy management system (100) having renewable energy sources and Modular Multilevel Converter MMC-High Voltage Direct Current HVDC system with energy storage, in accordance with one embodiment. The hybrid energy management system (100), referred to as a system (100) herein after, integrates electrical power generated from renewable energy sources with a battery energy storage system (BESS) (106) for the utilization of renewable energy sources integrated with energy storage to produce a stable and efficient supply of electrical power to an alternating current (AC) grid (122, 124).

In one implementation of the embodiment, power generation of system (100) is performed by a photovoltaic (PV) array (102) and a wind farm (104). In various embodiments, the system (100) may include various types of renewable energy resources.

The photovoltaic (PV) array (102) configured to convert solar energy into electrical energy in the form of direct current (DC). The PV array (102) may comprise various configurations, including but not limited to monocrystalline, polycrystalline, or thin-film solar cells.

The wind farm (104) includes wind turbines that convert the wind's kinetic energy into electrical energy, supplementing the DC power supply. The wind farm (104) may utilize turbines of differing sizes and capacities, dependent on the energy requirements and environmental conditions.

Electrical energy from both the PV array (102) and the wind farm (104) is directed to the BESS (106), which serves to store excess energy and provide a continuous power supply during periods of low generation from the renewable sources. The BESS (106) may be configured with a variety of battery types such as lithium-ion, lead-acid, or other emerging storage technologies.

The system (100) includes a HVDC transmission line (109-1), alternatively referred to as a transmission link, having a first end (109-2), a second end (109-3), and a HVDC voltage (109-4).

A first Modular Multilevel Converter MMC1 (108) is configured to manage the voltage of the HVDC transmission line, converting the combined DC from the BESS (106) and renewable sources to a compatible form for HVDC transmission. The MMC1 (108) includes a first MMC voltage connected to the first end of the HVDC transmission line. The MMC1 (108) may include a variety of submodule configurations for conversion efficiency and grid compatibility.

The system (100) includes a first AC grid (122) including a first point of common coupling (PCC) (112) connected to the MMC1 (108). The first PCC has a first PCC voltage. The PCC (112) is implemented for collectively interfacing the outputs from the PV array (102), wind farm (104), and BESS (106) with the grid. The implementation of the PCC (112) enables the integration of multiple power flows into the grid infrastructure.

The system (100) further includes a second modular multilevel converter MMC2 (110) configured to convert AC to DC and enable the connection of the AC grid with the DC outputs from the PV array (102), wind farm (104), and BESS (106). The MMC2 (110) includes a second MMC voltage connected to the second end of the HVDC transmission line, and can be configured to accommodate varying levels of power throughput and grid specifications.

The system (100) further includes a second AC grid (124) including a second PCC (PCC1) (120) connected to the MMC2 (110). The BESS (106) includes a battery and a battery controller (126), and the PCC1 (120) including a second PCC voltage. The MMC2 (110) is configured to regulate the HVDC voltage. The battery controller (126) is configured to sense a voltage disturbance of the energy management system (100) and to switch a control mode between a normal operating mode and an excess energy control mode. In one aspect, the battery controller (126) is configured to operate in the normal operating mode. During the normal operating mode, the second MMC voltage is about 1.0 pu and the HVDC voltage is about 2.0 pu.

According to one embodiment, the system (100) further includes a Controlled Current Source ($I_{COM}$) and multiplier (M10) (114), which serves to adjust the output current from the BESS (106) and renewable energy sources (102, 104). The $I_{COM}$ and M10 (114) is configured for the scaling of system (100) capacity to meet varying demand levels of the electricity at the receiver's end.

In one embodiment, to maintain the quality of power being supplied to the grid, the system (100) includes high-pass filters (HPF), 116-1, 116-2, and 116-3, combinedly referred to as (116), employed within the PCC (112) configured to remove high-frequency disturbances from the output current. The HPFs (116) may be implemented in various configurations, including passive or active configurations, selected based on the filtering requirements.

The voltage at the PCC ($V_{PCC}$) (118) is monitored and regulated to ensure compatibility with the grid. The $V_{PCC}$ (118) is regulated for the seamless integration of the hybrid system (100) with the grid's existing infrastructure.

In another exemplary embodiment, a method to control excess energy in an HVDC network is disclosed. The HVDC network includes a HVDC transmission line having a first end, a second end, and a HVDC voltage. The HVDC network further includes a first MMC having a first MMC voltage connected to the first end of the HVDC transmission line, and a first AC grid (122) having a first PCC (PCC) (112) connected to the first MMC. The PCC (112) has a first PCC voltage. A second MMC (MMC2) is configured to regulate the HVDC voltage and connected having a second MMC voltage to the second end of the HVDC transmission line, and a second AC grid (124) having a second PCC (PCC1) (120) connected to the second MMC. The second AC grid (124) includes at least one solar photovoltaic system (100), at least one wind farm system (100), a battery energy storage system (100) including a battery and a battery controller, and the PCC1 (120) having a second PCC voltage. The PCC1 (120) includes sensing a voltage disturbance at the PCC1 (112) to determine a three-phase-to-ground low-voltage fault and changing the second MMC voltage from constant to variable. A variable second MMC voltage is proportional to the HVDC voltage in response to the three-phase-to-ground low-voltage fault. The three-phase-to-ground low-voltage fault causes the HVDC voltage to increase above a HVDC threshold voltage. The second PCC further includes signaling the battery controller by increasing the second PCC voltage in response to an increased second MMC voltage to switch the battery energy storage system (100) from a discharging mode to a mode, and delivering an energy from the solar photovoltaic system (100) and the wind farm system (100) to the battery energy storage system (100) to regulate HVDC voltage below the HVDC threshold voltage.

Figure 2:
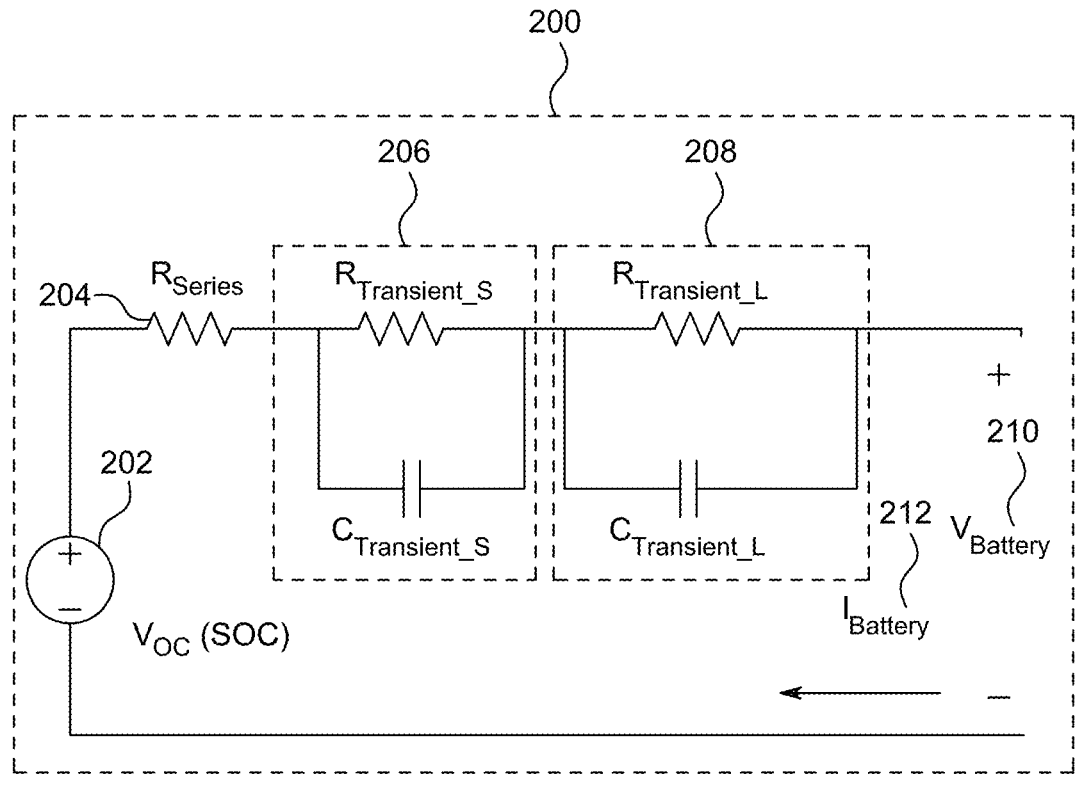
FIG. 2 illustrates the equivalent electrical circuit of a lithium-ion battery based on the Min/Rincón-Mora model, according to certain embodiments.

FIG. 2 illustrates the equivalent electrical circuit of a lithium-ion battery based on the Min/Rincón-Mora model, in accordance with one embodiment. The Min/Rincón-Mora model refers to an accurate, intuitive, and comprehensive electrical battery model that accounts for the dynamic characteristics of batteries. The model includes the nonlinear open-circuit voltage and the current, temperature, cycle number, and storage time-dependent capacity, as well as the transient response of the battery. FIG. 2 is a schematic representation of the battery's internal electrical characteristics that determine its charging and discharging aspects.

The equivalent electrical circuit, referred to as a circuit (200) hereinafter, is supplied with open-circuit voltage, $V_{oc}$ (202), represented as a voltage source in the circuit. $V_{oc}$ (202) is a variable dependent on the state of charge (SOC) of the battery 212, serving as a fundamental parameter that links the battery's chemical potential with its electrical output. The SOC itself is a measure of the battery's remaining capacity, and is measured for determining the operational lifespan and efficiency of the battery 212 during use. The $V_{oc}$ (202) is a non-linear function of the SOC, which may be represented through empirical data or derived from electrochemical principles, and is known to vary with temperature, aging, and the rate of discharge.

In the circuit (200), a series resistance, $R_{series}$ (204), is included to account for the ohmic losses within the battery cell. These losses are inherent to the internal components and conductive materials of the battery, such as the electrodes and electrolyte, and can vary based on the battery's construction and the materials used. For example, a battery with a high $R_{series}$ (204) may experience more significant voltage drops under high-current loads, reducing its effective output and efficiency.

In one aspect, two RC networks, referred to as a first RC network and a second RC network, are paired with $R_{series}$ (204). Both RC networks are configured to model the battery's transient response to changes in load. The short-term transient behavior is captured by the first RC network (206) having a resistor RTransient_S and capacitor CTransient_S pair, which simulates the battery's immediate response to sudden changes in current demand, such as those encountered during power surges in electronic devices or the start-up of an electric vehicle. The long-term transient behavior, represented by the second RC network (208) having RTransient_L and CTransient_L, accounts for the battery's response over extended periods of current draw. For example, those as seen in steady-state discharging during energy storage applications or continuous operation of a device.

The cumulative effect of the circuit components results in the terminal voltage of the battery, $V_{Battery}$ (210), which is the actual voltage available at the battery's terminals during operation. This terminal voltage is a critical performance metric, as it determines the battery's ability to deliver power to an external circuit.

The current flowing through the battery, $I_{Battery}$, is the sum of the charging or discharging current, depending on whether the battery is being supplied with energy or supplying energy to a load.

Equation (1) elation defines the state of charge of the battery:

$$SOC = SOC_0 - \frac{1}{3600 \ AH} \int_0^t I_{Battery} dt \qquad (1)$$

where, $SOC_0$ is the initial state of charge, AH is the nominal ampere-hour of the battery, and $I_{Battery}$ is the battery charging/discharging current.

Equation (1) is known as the coulomb counting method or ampere-hour counting and current integration technique to determine the SOC, which involves integrating the current over time.

The coulomb counting method employs battery current readings mathematically integrated over the usage period to calculate SOC values. The coulomb counting method then calculates the remaining capacity simply by accumulating the charge transferred in or out of the battery. The accuracy of the method resorts primarily to a precise measurement of the battery current $I_{Battery}$ and accurate estimation of the initial SOC. With a pre-known capacity, which might be memorized or initially estimated by the operating conditions, the SOC of the battery can be calculated by integrating the charging and discharging currents over the operating periods. The accuracy or tuning of coulomb counting method is improved by adding the open circuit voltage method. Besides the coulomb counting method, in one aspect of the embodiment, a smart battery management system can be configured to provide information on the state of charge of the battery. In an exemplary illustration, the battery is rated for 4 MW for 15 min, which means that if a 4 MW steady power injection is maintained for 15 min, the battery will be fully charged. The battery will also be completely discharged after 15 min of draining at a 4 MW rate. Therefore, the energy density=Power capacity×discharge time=4 MW×0.25 h=1 MWh.

In an example, the system can implement a range of commercial BESS which utilize the principles depicted in the equivalent circuit for various functionalities including frequency regulation, voltage stabilization, and energy arbitrage. Examples of the commercial BESS include, but may not be limited to, The EssPro™ Grid from ABB (Switzerland), SIESTORAGE from Siemens (Germany), MaxSine™ eStorage from Alstom (France), AEG BESS from AEG Power Solutions (Netherlands), Battery Energy Storage System from Toshiba (Japan), GE Energy Storage from GE (US), Power Storage Solution from Bosch (Germany), Advancion® 4 Energy Storage from AES (US), and the Eos Aurora® 1000|4000 from Eos (US).

The commercial BESSs might use the described lithium-ion model or other chemistries like sodium-sulfur or lead-acid, chosen for their specific energy and power characteristics, lifecycle, and cost considerations.

For instance, the EssPro™ Grid, according to ABB, can be used for a variety of applications, including frequency regulation, spinning reserves, smoothing out rapid voltage and power fluctuations brought on by intermittent renewable energy sources, peak shaving and load levelling, improving power quality, acting as an uninterruptible power supply (UPS), and assisting in maintaining grid voltage by injecting or absorbing reactive power.

Additionally, the EssPro™ Grid system accommodates various battery technologies, allowing for customization based on application requirements, such as high power for frequency regulation or high energy for load leveling tasks. The maximum DC voltage of the EssPro™ Grid is 1.2 kV, and the output active power ranges from 100 kW up to 30 MW, with a nominal energy capacity from 200 kWh up to 7.2 MWh. In an example, four units of 1 MW discharge power capacity EssPro™ Grid containers connected in parallel. The technical specifications for one EssPro™ Grid container are presented in Table 1.

TABLE 1

| Technical specifications for one EssProTM Grid container | | |
|---|---|---|
| Parameter | Value | |
| Discharge power | 1 MW | 0.5 MW |
| Maximum DC voltage | 1.2 kV | 1.2 kV |
| Battery current | 833.3 A | 416.7 A |
| Discharge time | 0.25 h | 0.25 h |
| Energy capacity | 0.25 MWh | 0.125 MWh |

The described BESS systems typically integrate into the grid via power electronics like the aforementioned MMC2-supported AC grid, where they can either store excess renewable energy or provide necessary power during demand peaks. The power electronics involved, whether for photovoltaic or wind energy applications, are tuned to adjust energy capture and conversion efficiency, often employing algorithms, such as the incremental conductance method for maximum power point tracking in solar panels, or field-oriented control for required torque in wind turbines.

Figure 3:
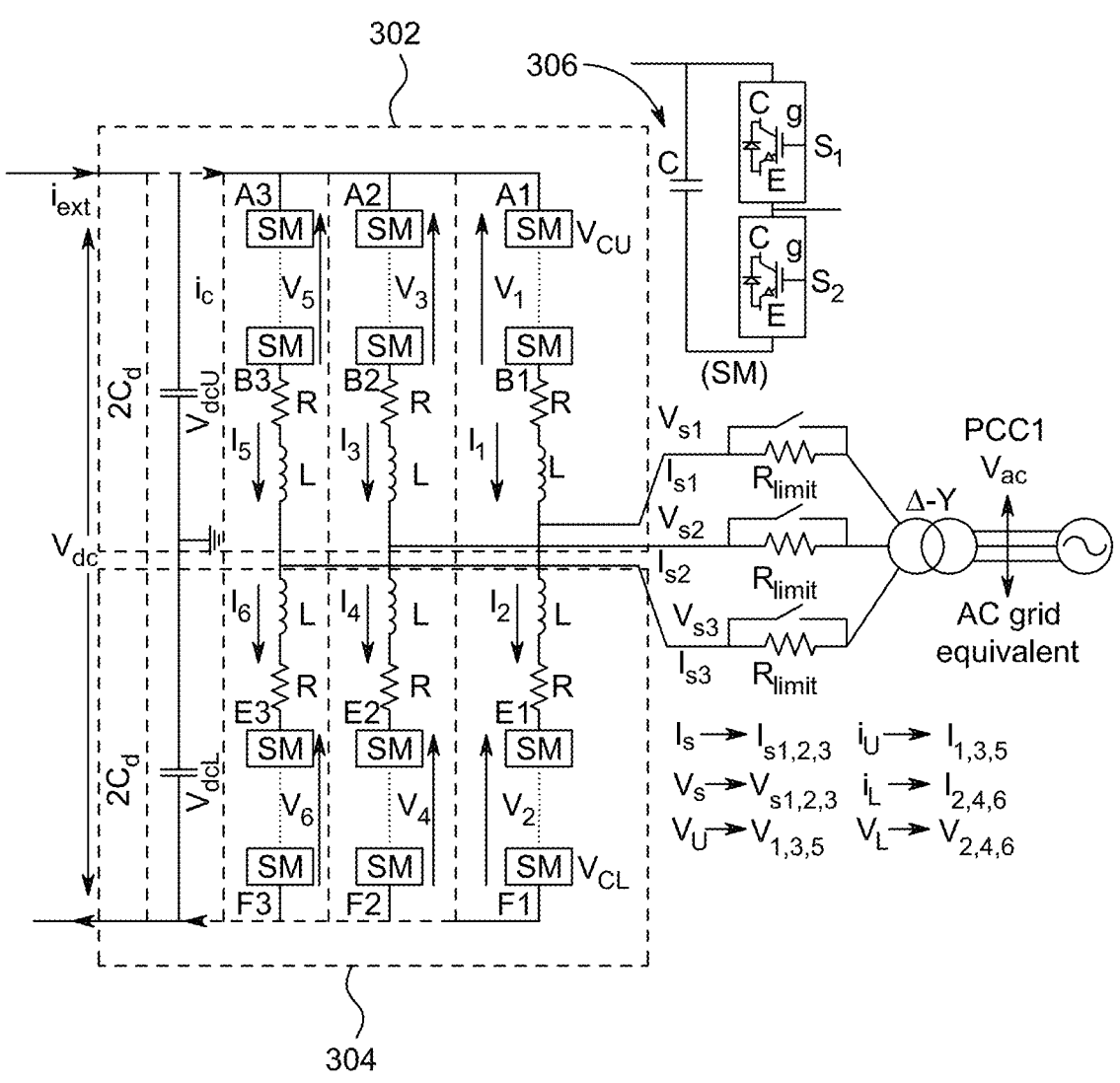
FIG. 3 illustrates an equivalent electrical circuit depicted for a Modular Multilevel Converter (MMC1) utilized within a High Voltage Direct Current (HVDC) transmission system, according to certain embodiments.

FIG. 3 illustrates an equivalent electrical circuit is depicted for the Modular Multilevel Converter (MMC1) utilized within a High Voltage Direct Current (HVDC) transmission system, in accordance with one embodiment.

The MMC1 comprises a network of cascaded submodules, divided into upper (302) and lower (304) arms, each consisting of multiple series-connected submodules. The submodules are the fundamental building blocks of the MMC1, with each capable of being individually controlled to contribute to the voltage generation process. The upper arms (302) and lower arms (304) are symmetrically configured to ensure balanced operation, and arm-circulating current control in addition to an outer current loop and an inner current loop.

The MMC1 includes a capacitor (306), which stores energy and contributes to the voltage output of the arm. Alongside the capacitors, switching elements (not shown), typically IGBTs or similar semiconductor devices, are employed to regulate the charge and discharge of the capacitors, thereby controlling the overall voltage output.

An outer control loop (shown in FIG. 4) is responsible for regulating the DC link voltage and the AC current to the grid. An inner control loop (shown in FIG. 4) works in tandem with the outer loop, providing fast dynamic responses to changes in the load or grid conditions, thus stabilizing the overall power conversion process.

Figure 4:
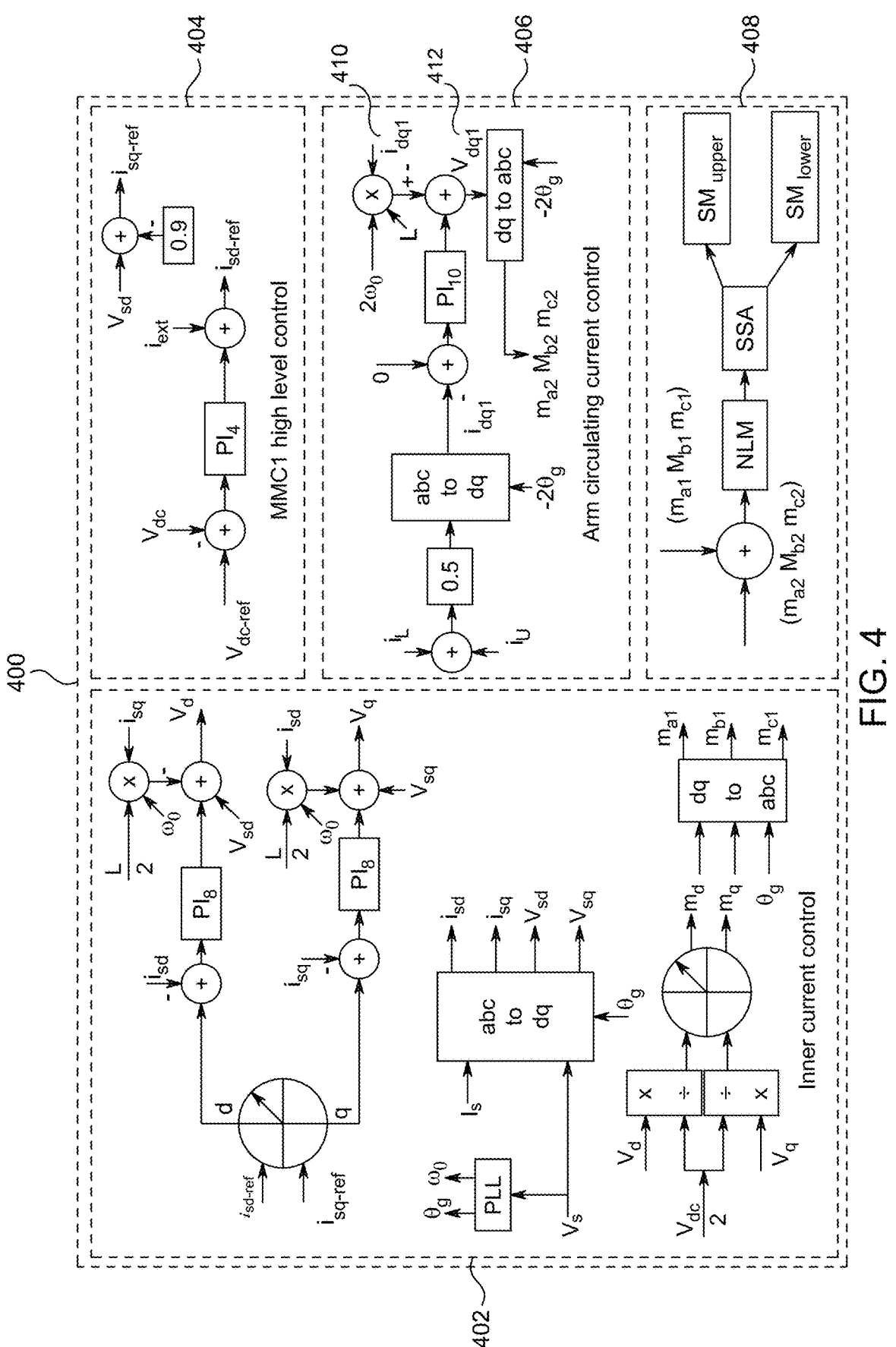
FIG. 4 illustrates a schematic of outer and inner control loops of MMC implemented within a High Voltage Direct Current (HVDC) system, according to certain embodiments.

FIG. 4 illustrate a schematic of outer and inner control loops of MMC implemented within a High Voltage Direct Current (HVDC) system (400), in accordance with one embodiment. The control system encompasses both outer and inner loops for managing power conversion dynamics and maintaining voltage levels across the HVDC link. The MMC1 and the MMC2 each includes an inner current loop and an outer current loop. The first inner current loop of the MMC1 is identical to a second inner current loop of the MMC2.

The inner control loop is articulated by a set of dynamic equations governing the steady-state operation in the d-q (direct-quadrature) frame, as established by Equations (2) and (3).

$$\frac{L}{2}\frac{di_{sd}}{dt} + \frac{R}{2}i_{sd} = \frac{L}{2}\omega_0 i_{sq} + V_d - V_{sd} \qquad (2)$$

$$\frac{L}{2}\frac{di_{sq}}{dt} + \frac{R}{2}i_{sq} = -\frac{L}{2}\omega_0 i_{sd} + V_q - V_{sq} \qquad (3)$$

The equations (2) and (3) delineate the behavior of the MMC's d-axis current and q-axis current, relating them to respective d-axis voltage and q-axis voltage, as well as the MMC's angular frequency ($\omega\_0$) and inductance (L) and resistance (R) parameters. The control loop regulates the MMC's current injection into the HVDC link, modulating it according to the instantaneous power requirements.

The HVDC-link voltage control, also referred as MMC1 high level control (404), encapsulated by Equation (4), monitors and adjusts the DC voltage ($V_{dc}$) through the capacitive elements ($C_d$) and (C) in the converter, ensuring the stability of power transmission across the system.

$$\left(C_d + \frac{6C}{N}\right)\frac{dV_{dc}}{dt} = i_{ext} - i_{sd} \qquad (4)$$

To assure a balanced current flow between the upper arm (302) and the bottom arm (304) of the MMC1, an arm circulating current controller (406) operates in conjunction with the inner current loop (402). The arm circulating current controller (406) is configured to counteract disparities that may occur during the power conversion process. The circulating current, cycling at twice the grid frequency ($2\omega\_0$), is modulated according to Equations (5) and (6), allowing for the precise handling of differential arm currents (i_d1, i_q1).

$$\frac{di_{d1}}{dt} + Ri_{d1} = 2L\omega_0 i_{q1} + V_{d1} \qquad (5)$$

$$\frac{di_{q1}}{dt} + Ri_{q1} = -2L\omega_0 i_{d1} + V_{q1} \qquad (6)$$

In the above Equations (5) and (6), the d-q-current transformed from the MMC's upper arm (302) and lower arm (304) differential currents are $i_{d1}$ and $i_{q1}$ (410). The $PI_{10}$ controller generates the necessary adjustments in terms of $V_{d1}$ and $V_{q1}$ (412), which are then converted into modulating signals. The first and second inner control loop is configured to produce a modulating signal according to the battery controller. The angle for converting circulating current to dq-frame, and $V_{dq1}$ to modulating signal, is $-2\theta g$, as shown in FIG. 4.

The control system applies a Nearest Level Modulation (NLM) (408) to select the appropriate number of submodules for activation, integrating signals from both the inner current control and circulating current control systems. The NLM (408) ensures the conversion of power with minimal harmonic distortion. A submodule-sorting algorithm (SSA) is introduced to mitigate voltage imbalances among the submodules (SM) within each arm of the MMC. The SSA algorithm is configured to select submodules based on their voltage levels and the direction of current flow, enhancing the MMC's efficiency and longevity.

Figure 5:
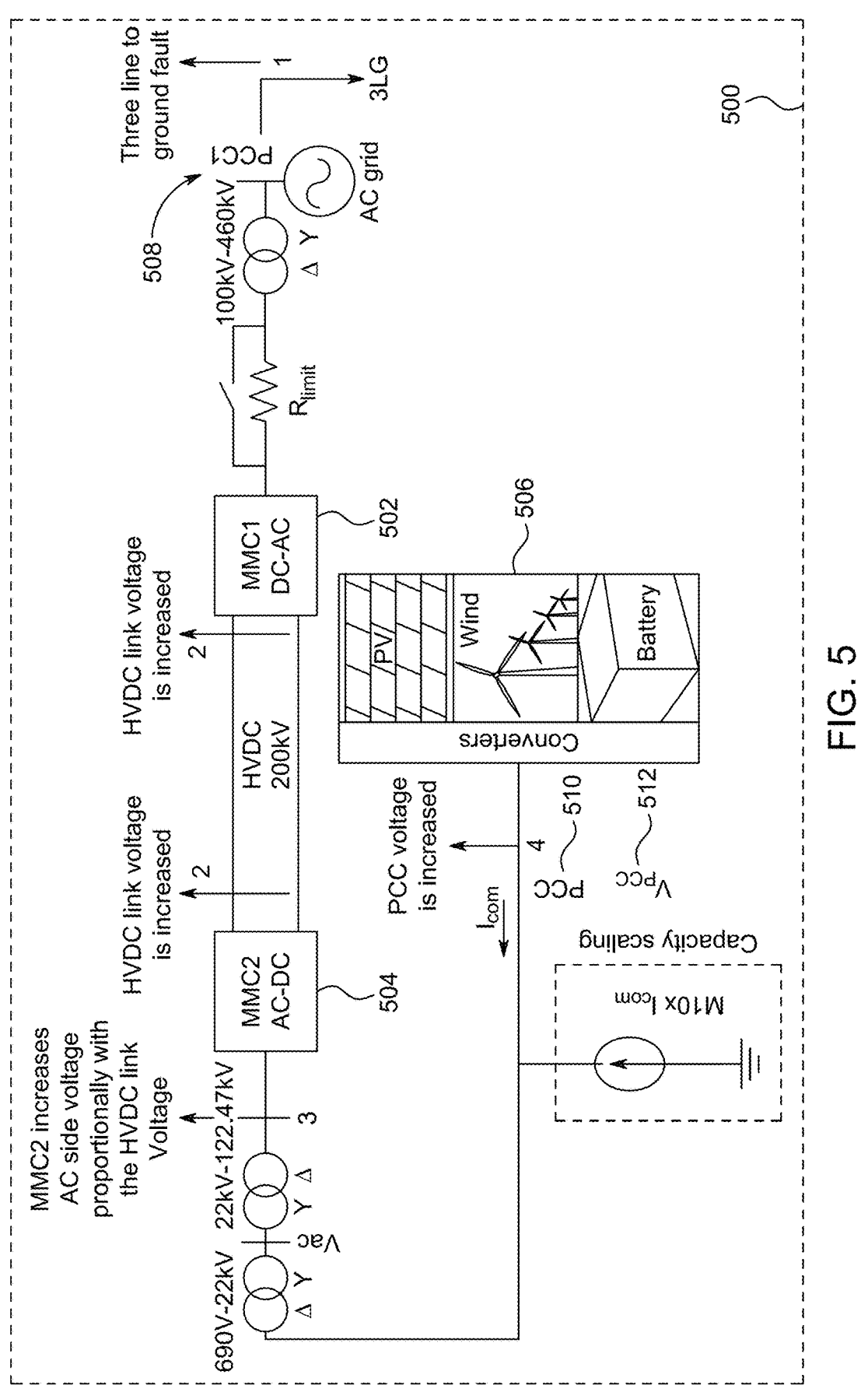
FIG. 5 is an illustrative depiction of a control management configuration implemented in a Modular Multilevel Converter (MMC) system for managing surplus energy within an HVDC link during low-voltage faults at a PCC1, according to certain embodiments.

FIG. 5 is an illustrative depiction of a control management configuration implemented in a Modular Multilevel Converter (MMC) system for managing surplus energy within an HVDC link during low-voltage faults at a PCC1, in accordance with one embodiment. The configuration (500) is particularly applicable when standard Dynamic Braking Resistors (DBR) are omitted in favor of battery utilization, enhancing system stability and energy efficiency.

As described earlier with reference to FIG. 1, the MMC system comprises two primary converters, MMC1 (108) and MMC2 (110). With reference to FIG. 5, MMC1 (502), connected to the HVDC link typically operates under a power transfer regime constrained by the nominal HVDC link voltage. Conversely, MMC2 (504), primarily responsible for integrating renewable energy sources (506) with the grid, functions to regulate the AC side voltage in relation to the HVDC link voltage.

The low-voltage fault at the PCC1 of the MMC1 (502) side limits MMC1's power transfer capability, which raises the HVDC-link voltage. Usually, the DBR is placed in parallel with the transmission line for dissipation of the surplus energy to regulate the HVDC-link voltage within limits. To dissipate a significant quantity of the HVDC power during the three-line-to-ground (LLLG) low-voltage fault at the PCC1 (508) of the AC grids, several series-parallel combination semiconductor switches are needed. The HVDC connection voltage is subject to multiple switching introduced by the dynamic braking resistor, which may cause variations in the real power flow. Additionally, a battery is utilized to remove the DBR from the system. However, the battery is far away from the HVDC-link and placed with the same AC bus that connects wind and solar energy. The MMC2 controller, thus, is configured to control the AC link voltage used to integrate renewable energy and energy storage.

Figure 6:
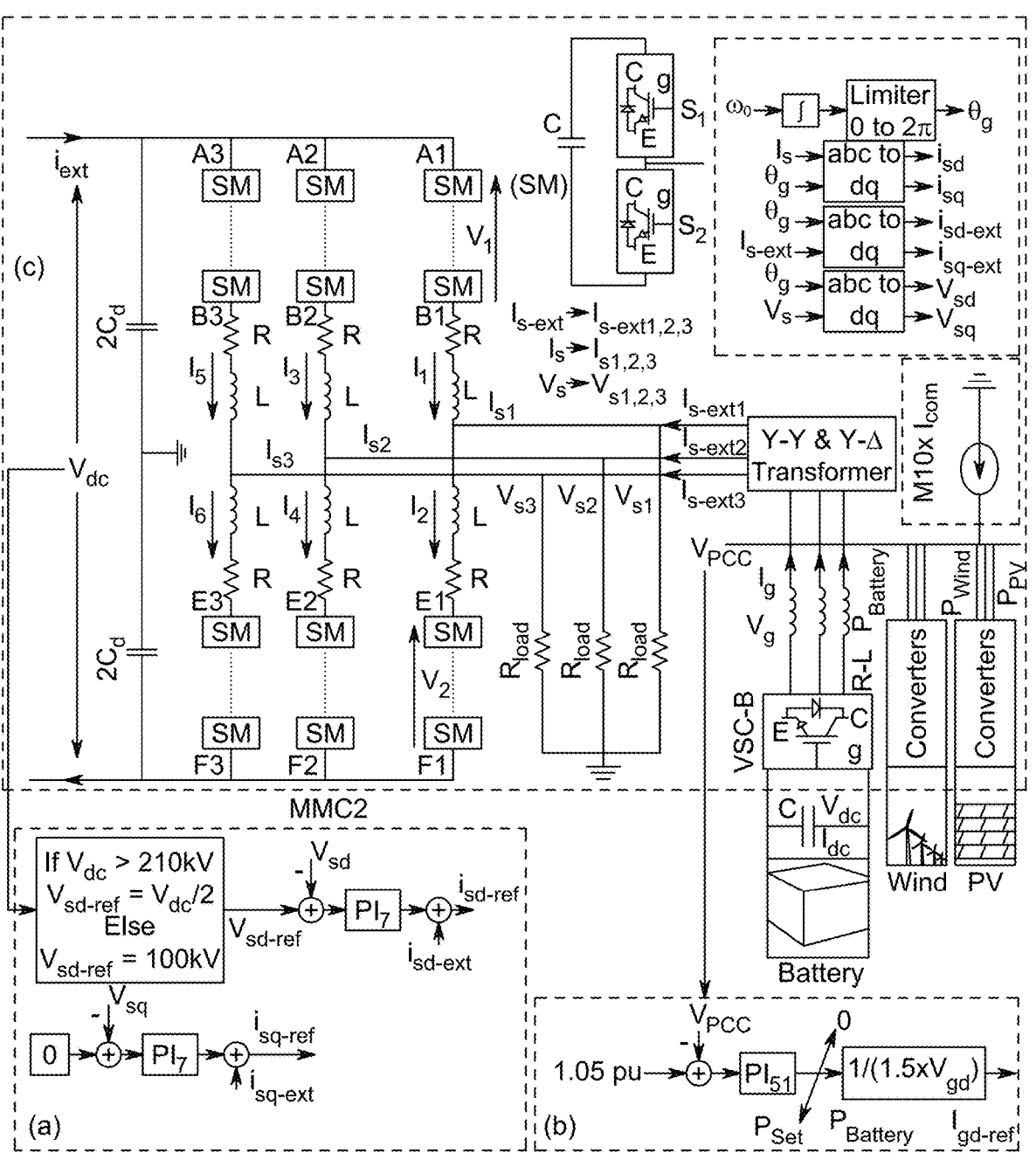
FIG. 6 depicts a configuration for excess energy control of HVDC-link and power smoothing for (a) MMC2 outer control and (b) reference power of battery for the HVDC-link's surplus energy control, according to certain embodiments.

Referring back to FIG. 5, upon the occurrence of a three-phase-to-ground low-voltage fault at PCC1 (508), MMC1 (502) experiences a diminished power transfer capability, leading to an elevation of the HVDC link voltage. MMC2's (504) operational mode shifts from a constant to a variable AC voltage control. The MMC2 (504) controller adapts its reference voltage in response to the altered HVDC link voltage, resulting in an increased AC voltage at the PCC (510). As understood, the reference AC voltage for the MMC2 control loop changes from fixed to variable, and increases with the HVDC-link voltage. Consequently, the AC side voltage of the MMC2 rises. As shown in FIG. 6A, the reference voltage for MMC2 AC link is changed from 100 kV to ($V_{dc}$)/2 if the HVDC link voltage rises more than 210 kV. 200 kV is the nominal voltage for HVDC link (Vdc). During normal operating mode, the reference AC link voltage is 100 kV.

The rise in the AC link voltage of MMC2 (504) increases the AC voltage of the PCC (510) or the magnitude of VPCC (512). It provides the sensing signal for the charging and discharging controller of the BESS. As shown in FIG. 6B, an increased VPCC (>1.05 pu) provides a negative real current command that means the battery is charged. Therefore, the solar and wind energy is delivered to the battery due to the charging command, instead of going to HVDC-link. Hence, the HVDC-link voltage remains regulated within its limit. The inner current control loop of MMC2 (504) is the same as MMC1 (502).

The system's (500) response to the fault is characterized by a series of steps, including the detection of the fault, adjustment of the control reference for MMC2 (504), and the subsequent modulation of the PCC voltage (510). These steps are executed to curtail the surplus energy flow to the HVDC link and redirect the renewable energy towards battery charging, thereby maintaining voltage stability.

FIG. 6A depicts a configuration for excess energy control of HVDC-link and power smoothing MMC2 outer control, in accordance with one embodiment. FIG. 6A depicts the specific actions taken by the MMC2 in response to low-voltage faults at PCC1 are depicted. When such faults occur, the MMC2 controller transitions from maintaining a constant AC voltage to a dynamic voltage control mode. This shift results in an incremental increase in the reference voltage for the MMC2, which is directly correlated with the rise in the HVDC link voltage.

FIG. 6B depicts a configuration for excess energy control of HVDC-link and power smoothing reference power of battery for the HVDC-link's surplus energy control, in accordance with one embodiment. The configuration serves a dual purpose. Firstly, the configuration elevates the PCC voltage, which, in turn, acts as a directive signal for the battery controller.

The battery controller, in one aspect, is configured to operate in the excess energy control mode during a three-phase-to-ground low-voltage fault at the first PCC by executing an energy control strategy. The energy control strategy includes changing the MMC2 voltage from constant to variable. A variable second MMC voltage is proportional to the HVDC voltage in response to the three-phase-to-ground low-voltage fault. The three-phase-to-ground low-voltage fault causes the HVDC voltage to increase above a HVDC threshold voltage. Further, the battery controller is signaled by increasing the second PCC voltage in response to an increased second MMC voltage to switch the battery energy storage system from a discharging mode to a charging mode. Then an energy is delivered from the solar photovoltaic system and the wind farm system to the battery energy storage system to regulate HVDC voltage below the HVDC threshold voltage.

In one aspect, the HVDC voltage is greater than the HVDC threshold voltage and the variable second MMC voltage is a half of the HVDC voltage. The HVDC threshold voltage is about 1.05 pu. The control logic dictates the diversion of excess energy into battery storage, thus averting potential overvoltage in the HVDC link. Therefore, the charging current command or the real current command for the battery is generated.

FIG. 6C depicts a configuration for excess energy control of HVDC-link and power smoothing charging and discharging control of battery, in accordance with one embodiment. The configuration ensures the stability of the HVDC link voltage by adjusting the battery's charge state. The configuration is finely tuned to respond to the varying conditions of the HVDC link, ensuring that the energy storage acts as a buffer to mitigate the impact of voltage fluctuations due to the intermittent nature of the connected renewable energy sources.

The reactive current of the battery side converter is maintained at zero. The inner current dynamics of the VSC-B in the dq-frame are expressed using the following equation during the steady-state condition:

$$L\frac{di_{gd}}{dt} + Ri_{gd} = L\omega_0 i_{gq} + V_d - V_{gd} \tag{7}$$

$$L\frac{di_{gq}}{dt} + Ri_{gq} = -L\omega_0 i_{gd} + V_q - V_{gq} \tag{8}$$

Equations (8) and (9) dictate the current dynamics of VSC-B using the dq voltage of the converter for the generation of the modulating signal (Ma, b, c).

Figure 7:
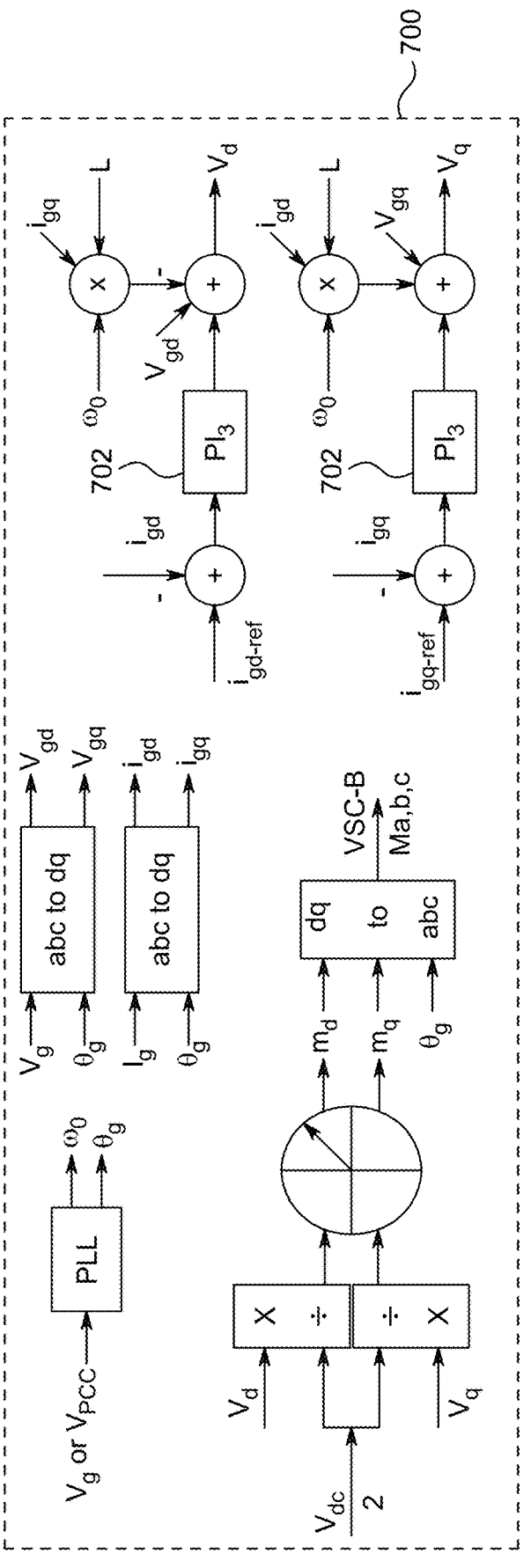
FIG. 7 illustrates a schematic of the inner current control loop for a battery side Voltage Source Converter (VSC-B), according to certain embodiments.

FIG. 7 illustrates a schematic of the inner current control loop for a battery side Voltage Source Converter (VSC-B), in accordance with one embodiment.

The inner control loop (700) is configured to respond to the direct-quadrature (d-q) frame dynamics of the VSC-B during steady-state conditions. The inner control loop is based upon the mathematical relationships defined by the system's inductance (L), resistance (R), and the angular velocity ($\omega\_0$), as these parameters interact with the d-axis and q-axis components of the current ($i_{gd}$, $i_{gq}$) and voltage ($V_d$, $V_{gd}$; $V_q$, $V_{gq}$).

A Proportional-Integral (PI) controller, referred to as PI3 (702) within the system, is finely tuned to follow a reference current, adjusting the VSC-B's output to match the desired current profile accurately. The PI3 controller's (702) output is subsequently compared against a triangular carrier wave to synthesize Pulse Width Modulation (PWM) gate pulses (not shown in Figures). These pulses directly influence the switching states of the converter's power electronics, ultimately shaping the AC waveform that is delivered to the load or fed back into the grid.

The implementation of the inner control loop facilitates the modulation of the signal (Ma,b,c), which is derived from the d-q voltages and is instrumental in the generation of the gate pulses for the converter. By doing so, the system ensures that the converter operates within a certain efficiency range, maintaining power quality and minimizing losses.

Figure 8:
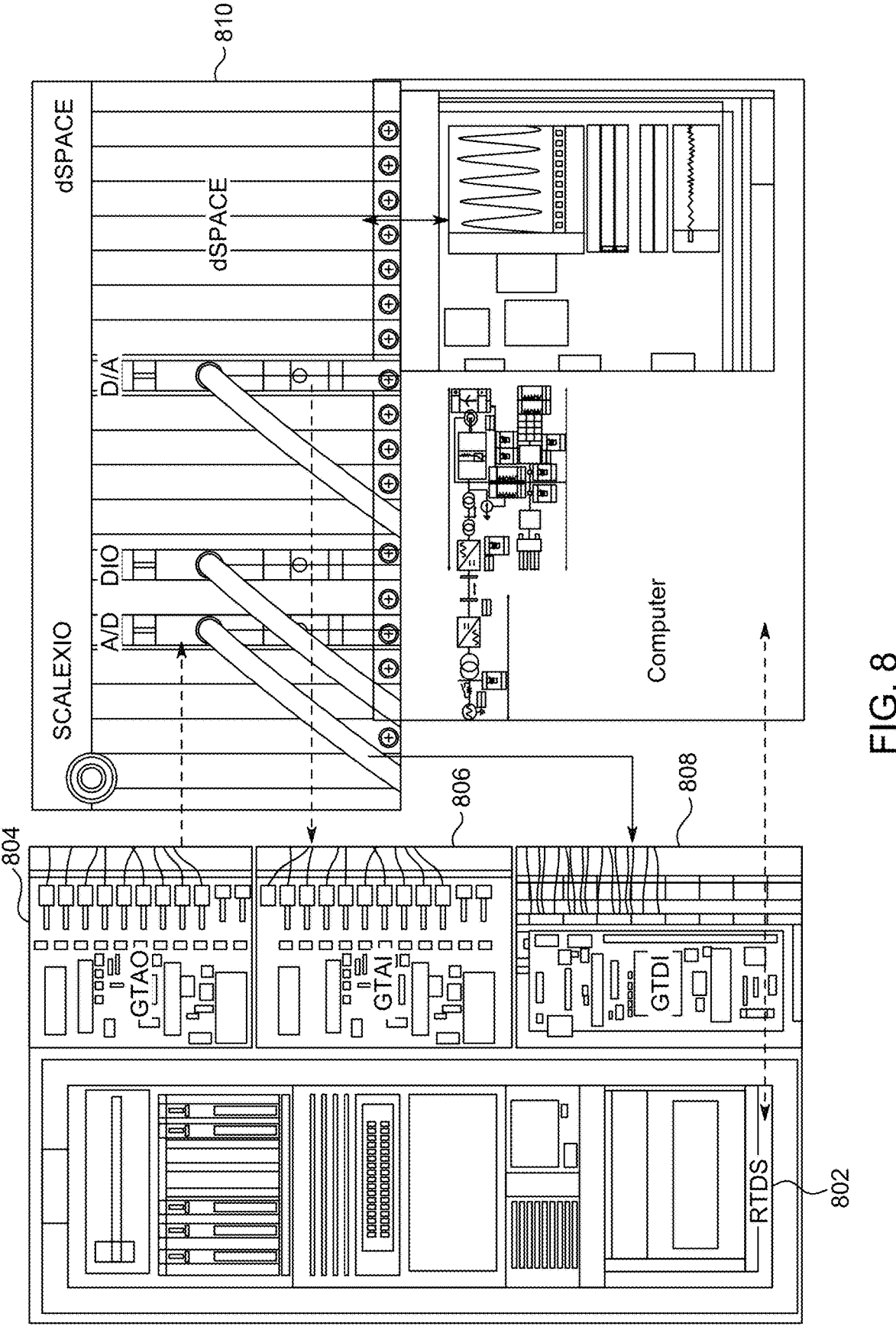
FIG. 8 depicts the hardware configuration integrating the Real-Time Digital Simulator (RTDS) with the dSPACE control system, according to certain embodiments.

FIG. 8 depicts the hardware configuration integrating the Real-Time Digital Simulator (RTDS) with the dSPACE control system, in accordance with one embodiment. The hardware configuration is implemented in the high-fidelity simulation environment for the HVDC system's operation. The RTDS (802), equipped with Gigabit Transceiver Analogue Output (GTAO) card (804), Gigabit Transceiver Analogue Input (GTAI) cards (806), and Gigabit Transceiver Digital Input (GTDI) card (808) serves as the primary simulation platform, offering real-time execution of complex electrical models. The RTDS (802) interfaces with the dSPACE system (810), which comprises SCALEXIO hardware-in-the-loop components, to facilitate real-time A/D (Analog to Digital), D/A (Digital to Analog) conversions, and digital I/O processing. The RTDS (802) generates precise, real-time waveforms and signals, which are transmitted to the dSPACE (810) system, where they are processed and used to generate control commands for the MMC.

Figure 9:
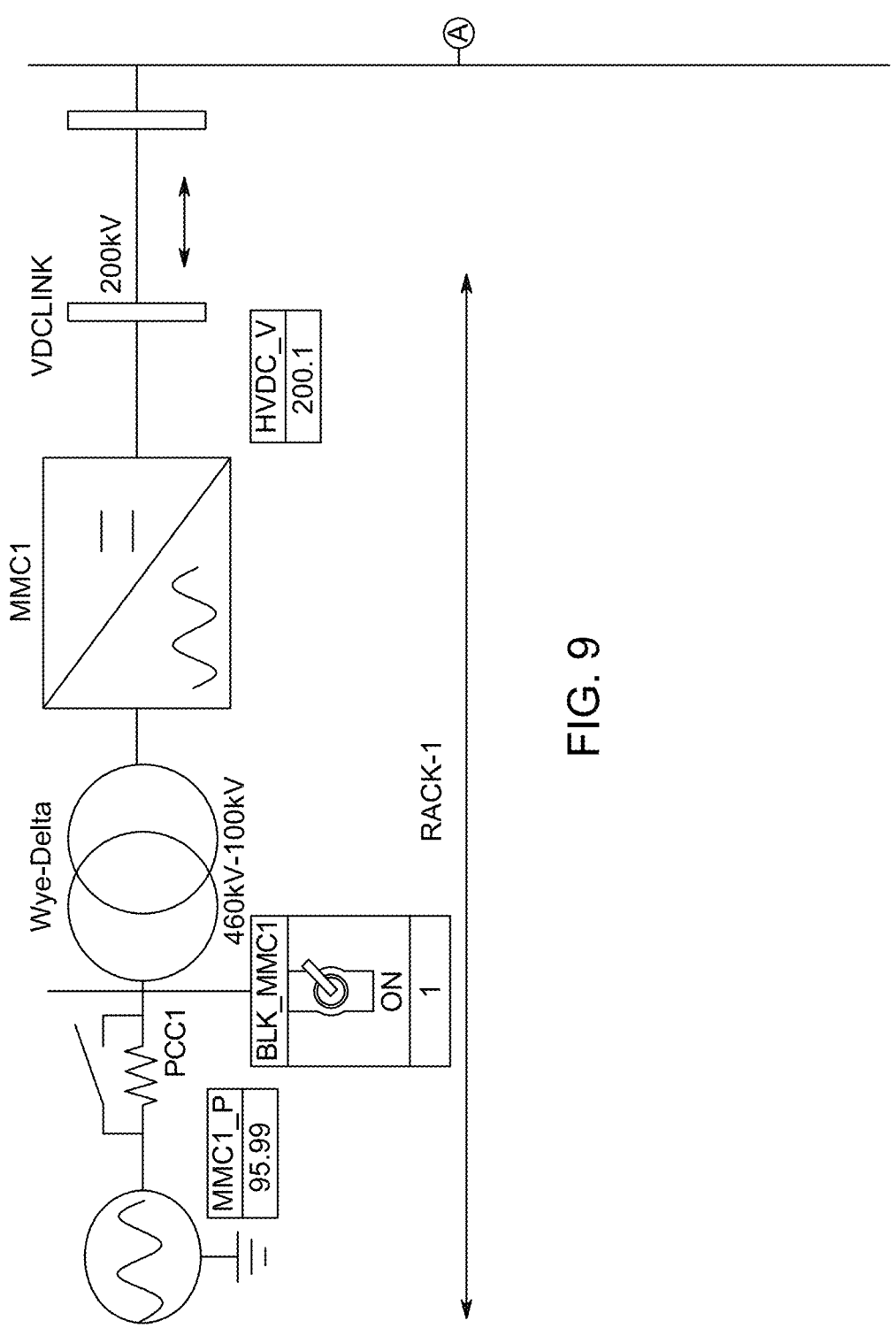
FIG. 9 illustrates the real-time user interfaces employed within the RTDS environment, according to certain embodiments.
Figure 9:
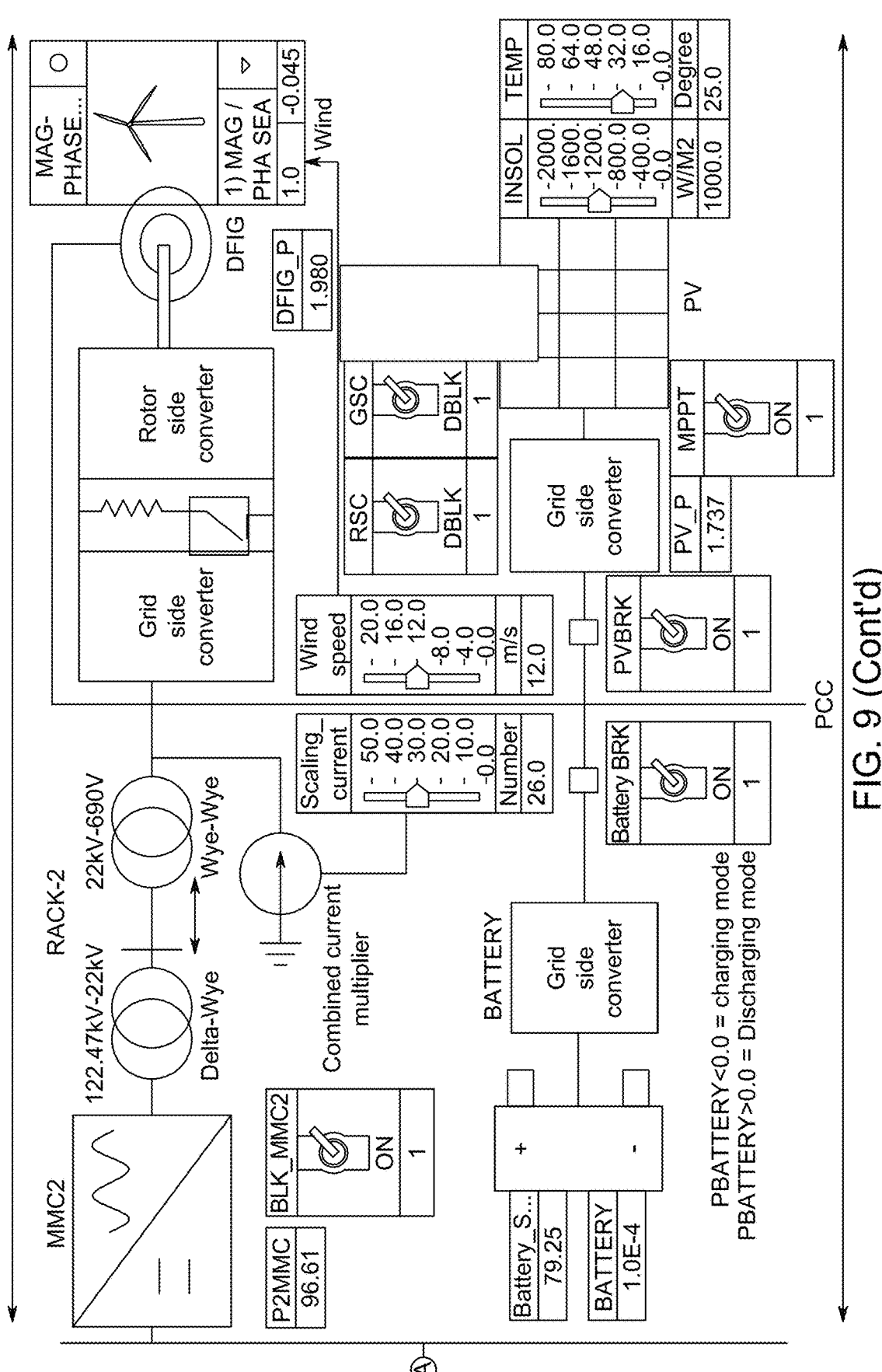

FIG. 9 illustrates the real-time user interfaces employed within the RTDS environment, in accordance with one embodiment. The illustrated configuration is a suite of tools for monitoring and controlling the HVDC system. The configuration allows operators to observe the system's dynamic behavior, adjust parameters in real-time, and conduct various simulation scenarios. These interfaces are configured for validating control strategies and ensuring the robustness of the HVDC system against a wide range of operating conditions.

Figure 10:
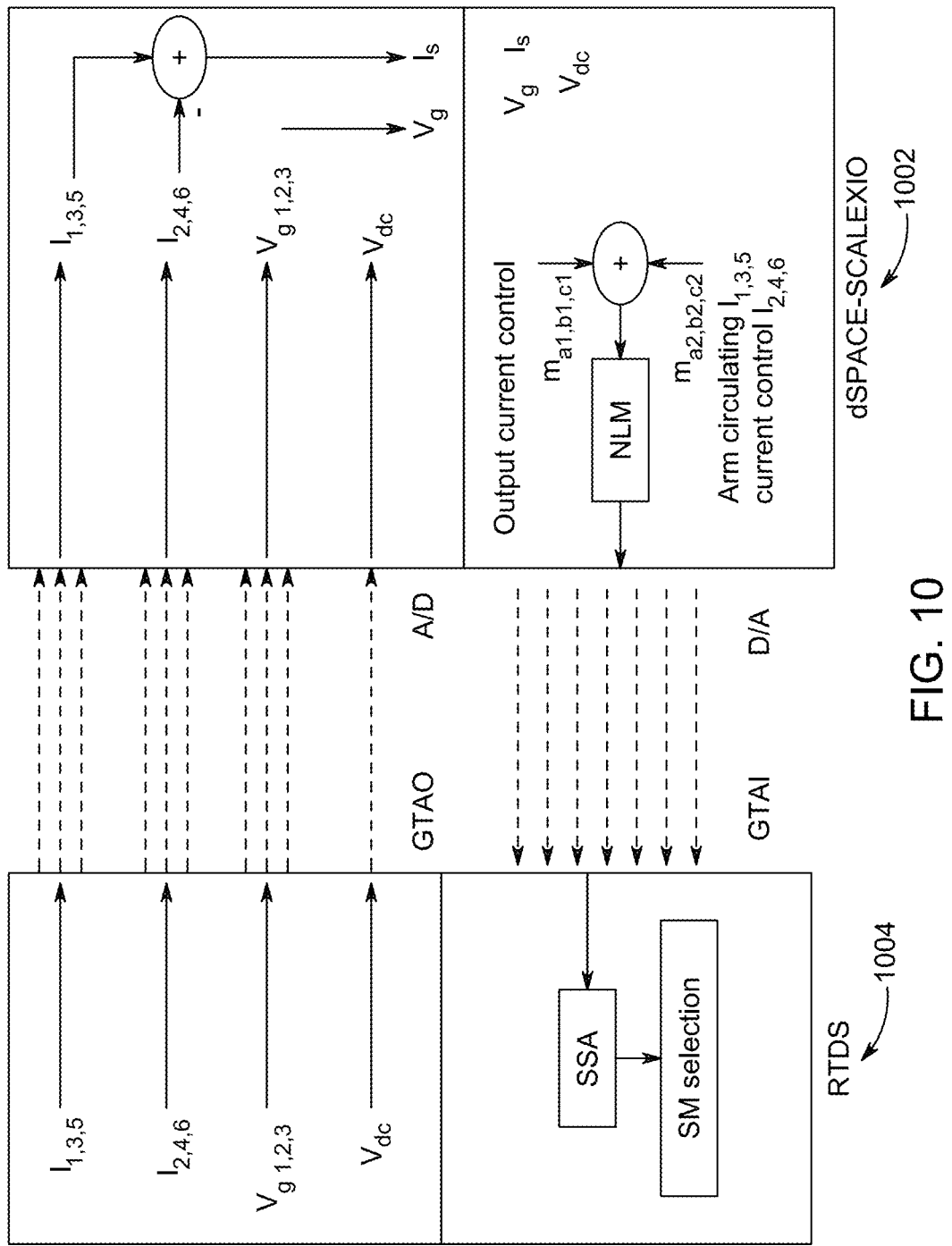
FIG. 10 illustrates the integration of the MMC1 controller within the dSPACE environment, according to certain embodiments.

FIG. 10 illustrates the integration of the MMC1 controller within the dSPACE environment, interfacing seamlessly with the RTDS, in accordance with one implementation. The dSPACE system (1002) receives signals from the RTDS (1004), processes them through its robust computational platform, and generates the necessary PWM commands for the MMC. Tables 2 and Table 3 provide the required information on the MMC-HVDC system.

TABLE 2

PV module, wind turbine, DFIG generator, and converter data.

PV module parameters

| Quantity | Value |
| --- | --- |
| Cells per module | 36 |
| Short circuit current | 3.35 A |
| Open circuit voltage | 21.7 V |
| Current at MPP | 3.05 A |
| Voltage at MPP | 17.4 V |
| Temperature coefficient of $I_{sc}$ | 0.065%/degree |
| Temperature coefficient of $V_{oc}$ | −0.56%/degree |

PV array parameter

| | |
| --- | --- |
| Series connected modules per string | 115 |
| Parallel strings | 285 |

Grid side VSC parameters for battery

| Quantity | Value |
| --- | --- |
| Nominal DC-link voltage | 2 kV |
| Rated power | 2.2 MVA |
| Resistance, R | 0.004 pu |
| Inductance, L | 0.15 pu |
| $PI_3$ | (1 + 100/s) pu |

Wind turbine parameters

| Quantity | Value |
| --- | --- |
| Nominal wind speed | 12 m/s |
| Nominal generator speed, DFIG | 1.2 pu |
| Nominal turbine power | 2 MW |

DFIG and controller parameters

| Quantity | Value |
| --- | --- |
| Stator voltage (L-L) | 690 V |
| Nominal frequency, f | 50 Hz |
| Nominal power | 2.2 MVA |
| Stator resistance, $R_s$ | 1 mΩ |
| Rotor resistance, $R_r$ | 1.3 mΩ |
| Inductance of stator, $L_s$ | 2.55 mH |
| Inductance of rotor, $L_r$ | 2.56 mH |
| Magnetizing inductance, $L_m$ | 2.44 mH |

High pass filter (HPF) parameters

| | |
| --- | --- |
| Filter inductance, $L_F$ | 4.3 μH |
| Filter capacitance, $C_F$ | 1.47 mF |
| Filter resistance, $R_F$ | 0.054 Ω |

TABLE 3

MMC and battery controller parameters.

| Parameters | Value |
| --- | --- |
| Rated power | 200 MW |
| Rated HVDC-link voltage | 200 kV |
| Rated AC voltage (L-L) | 100 kV |
| Nominal frequency | 50 Hz |
| Reactor resistance, R | 0.002 pu |
| Reactor inductance, L | 0.2 pu |
| Modulation | Nearest level |
| $PI_4$ | (4 + 100/s) pu |
| $PI_7$ | 0.6 + 6/s pu |
| $PI_{10}$ | 0.8 + 100/s pu |
| $PI_8$ | 0.6 + 6/s pu |
| AC grids' short circuit ratio | 10 |
| C | 16 mF |
| $C_d$ | 100 μF |
| SM/arm | 200 |
| DC line resistance per km | 1.39 mΩ |
| DC line inductance per km | 0.159 mH |
| DC line capacitance per km | 0.231 μF |
| M10 | 26 |

Parameters of battery controller

| | |
| --- | --- |
| Battery discharge power capacity | 4 MW |
| Duration | 15 min |
| $PI_{51}$ | (20 + 15/s) pu |
| $PI_{52}$ | (3 + 10/s) pu |
| Number of cells in series in a stack | 325 |
| Number of stacks in parallel | 834 |
| Capacity of a single cell | 1.00 AH |
| Nominal cell voltage | 3.7 V |

Figure 11:
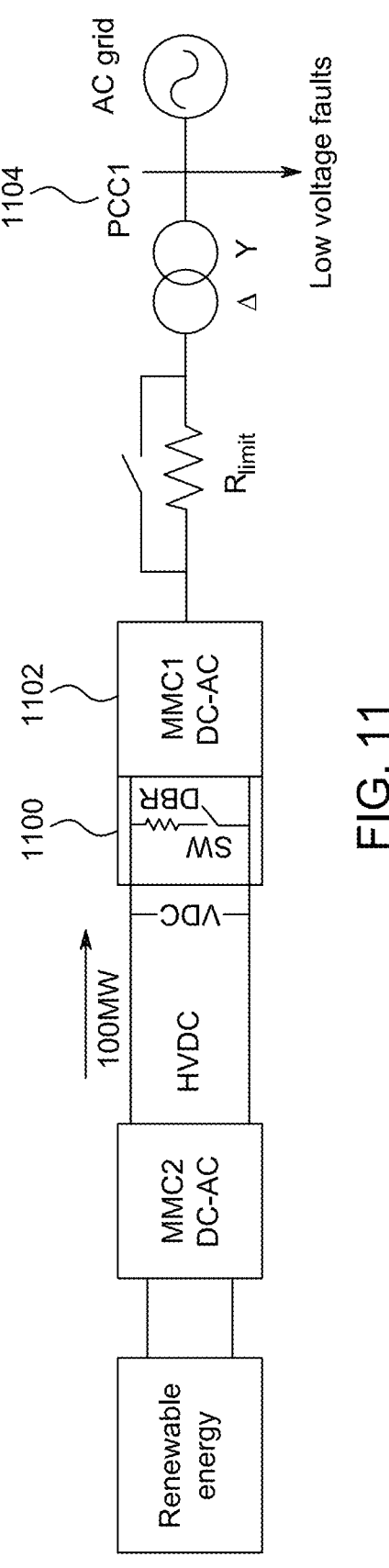
FIG. 11 illustrates a schematic diagram of a Dynamic Braking Resistor (DBR) to regulate the voltage of an HVDC link when a low-voltage fault occurs at the Point of Common Coupling (PCC1), according to certain embodiments.

FIG. 11 illustrates a schematic diagram of a Dynamic Braking Resistor (DBR) to regulate the voltage of an HVDC link when a low-voltage fault occurs at the Point of Common Coupling (PCC1), in accordance with one embodiment. The DBR (1100) is configured to curtail the power transfer capacity of Modular Multilevel Converter 1 (MMC1) (1102), which is directly influenced by such faults, causing an elevation in the HVDC link voltage.

The DBR (1100), is connected in parallel with the transmission line to promptly dissipate the surplus power engendered by the voltage surge. Upon the incidence of a low-voltage fault at PCC1 (1104), the DBR (1100) activates, introducing a series of switches that manage the excess energy transfer, thereby stabilizing the HVDC link voltage, thus ensuring the voltage perturbations are swiftly addressed, and safeguarding the integrity of the HVDC system.

Figure 12:
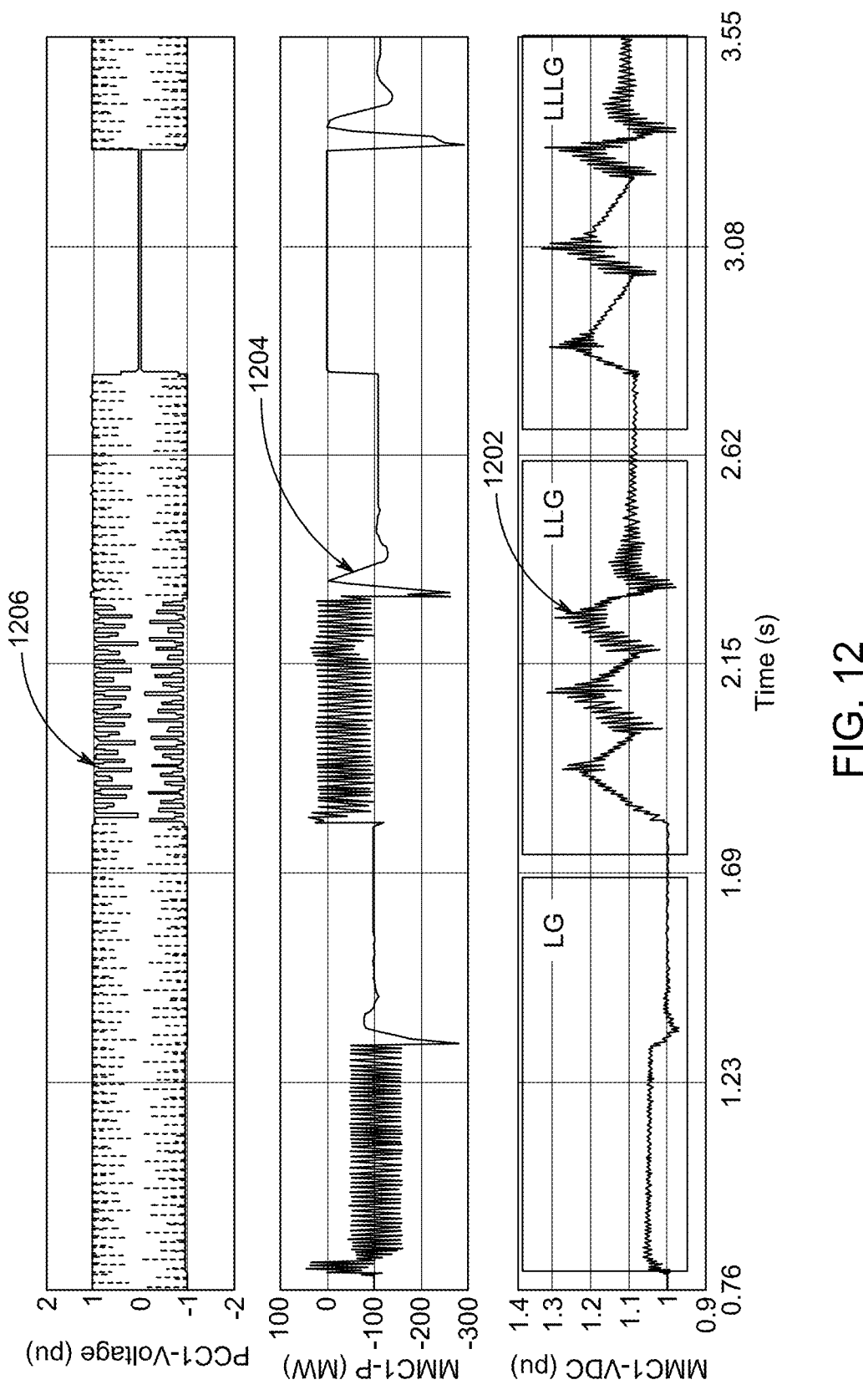
FIG. 12 is a graphical illustration of performance of a DBR controller during low-voltage, according to certain embodiments.

FIG. 12 is a graphical illustration of performance of a DBR controller during low-voltage, in accordance with one embodiment. A graph (1202) indicates performance of the DBR plotted as time(s) vs. MMC1-VDC (pu) during LG, LLG, and LLLG phases. A graph (1204) indicates performance of the DBR plotted as time(s) vs MMC1-P (MW). A graph (1206) indicates performance of the DBR plotted as time(s) vs PCC1-voltage (pu).

It is clearly visible from FIG. 12 that the excess energy in the HVDC link is dissipated across the parallelly connected DBR during low-voltage faults. Although DBR controls the HVDC link voltage, it introduces several switches that affects the HVDC voltage as well as the power flow. The HVDC link voltage is effectively managed without reliance on a dynamic braking resistor (DBR). The integrity of the battery controller's capacity to maintain the HVDC-link voltage within predefined parameters for a PV-wind-battery integrated MMC-HVDC network was verified through the application of both balanced and unbalanced fault conditions at PCC1.

Figure 13:
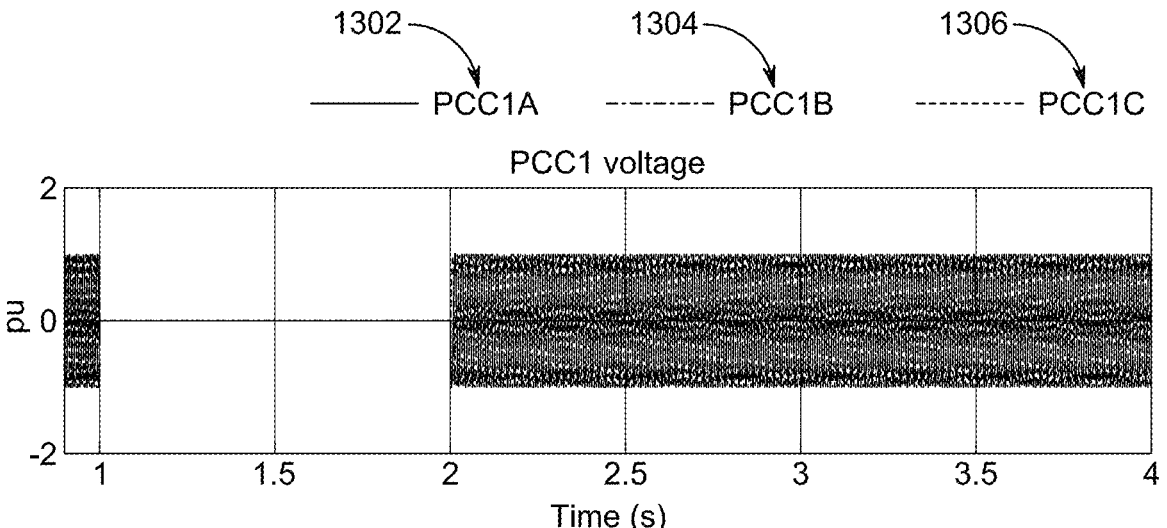
FIG. 13 depicts a graphical representation of PCC1 voltage for the low-voltage LLLG fault duration, according to certain embodiments.

FIG. 13 depicts a graphical representation of PCC1 voltage for the low-voltage LLLG fault duration, in accordance with one embodiment. Upon the occurrence of a fault at PCC1, the battery system adeptly absorbed excess energy from the HVDC link, thereby preventing any disruption to photovoltaic and wind power generation. For instance, as depicted in FIG. 13, a low-voltage fault spanning one second in duration, specifically a three-line-to-ground fault, was initiated at PCC1 at the one-second mark. A graph (1302) indicates response of PCC1A, a graph (1304) indicates response of PCC1B, and a graph (1306) indicates response of PCC1C representing stable output after introducing delay of 1 second between PCC1A and PCC1B, and PCC1B and PCC1C.

Figure 14:
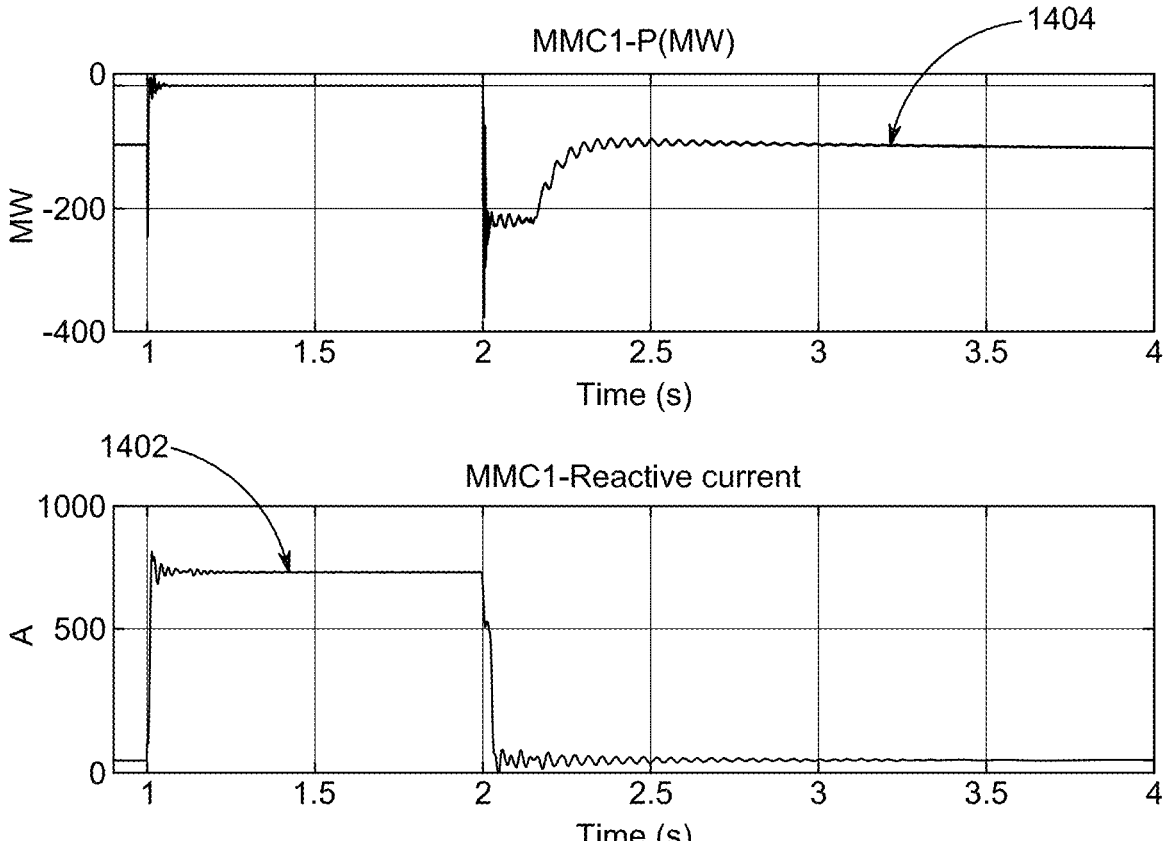
FIG. 14 is a graphical representation of Real power and reactive current of MMC1 during the event of an LLLG fault, according to certain embodiments.

FIG. 14 is a graphical representation of Real power and reactive current of MMC1 during the event of an LLLG fault, in accordance with one embodiment. Concurrent with the fault condition, as detailed in FIG. 14, the real power output of MMC1 was significantly reduced, while the stability of photovoltaic and wind energy generation was upheld. During low-voltage LLLG and LLG faults at PCC1, the MMC1 injected approximately 720 A reactive current. A graph (1402) indicates response of MMC-1 reactive current, and a graph (1404) indicates response of MMC-1-P (MW).

Figure 15:
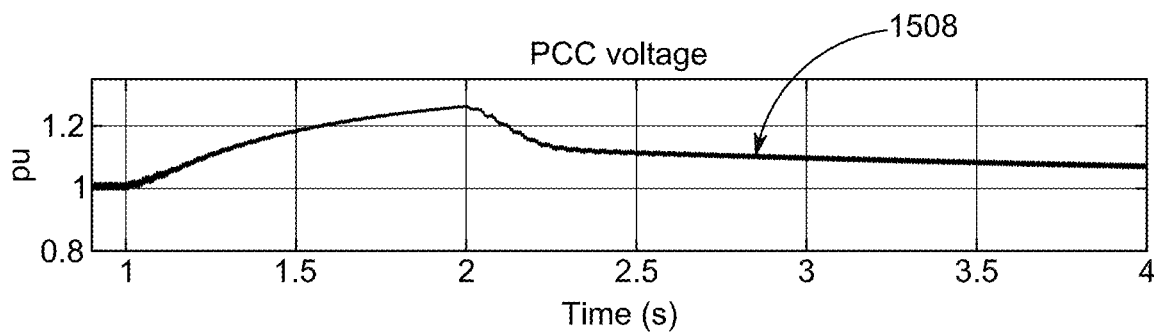
FIG. 15 is a graphical representation of the stability achieved by proportionally charging the battery system to elevate the voltage at PCC when the reactive current is 720 A, according to certain embodiments.
Figure 15:
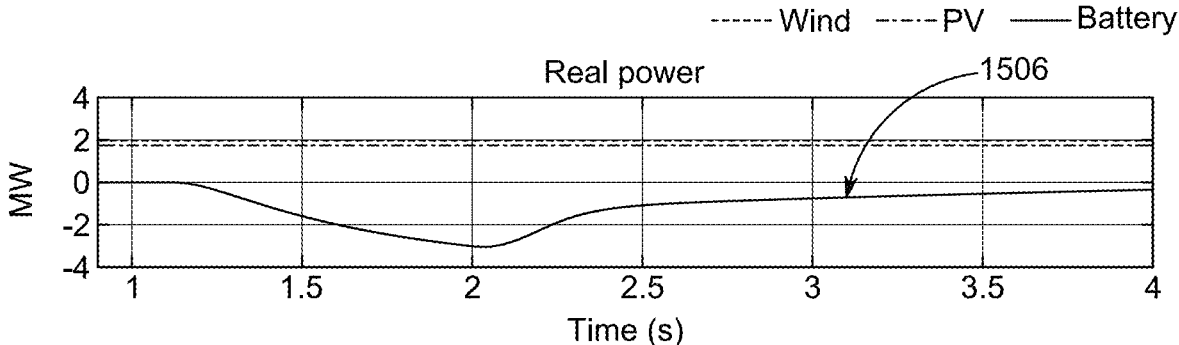
Figure 15:
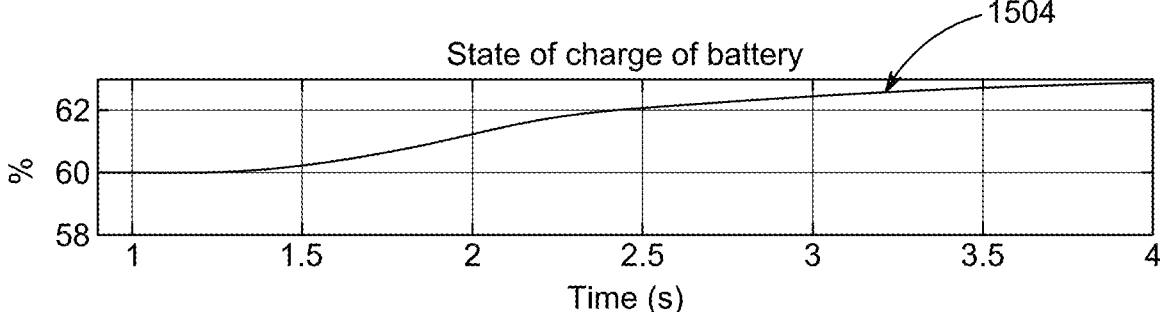
Figure 15:
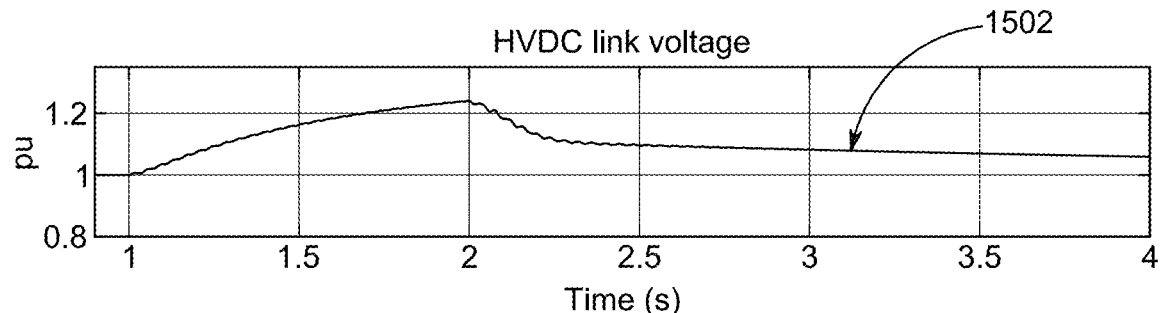

FIG. 15 is a graphical representation of the stability achieved by proportionally charging the battery system to elevate the voltage at PCC when the reactive current is 720 A, in accordance with one embodiment. FIG. 15 represents PCC voltage, real power change of wind, PV, and battery source, battery SOC, and HVDC-link voltage throughout the LLLG fault when the reactive current is 720 A. The system ensured that, upon the PCC voltage exceeding 1.05 per unit (pu), the photovoltaic and wind energy were redirected towards the battery, maintaining the HVDC-link voltage at approximately 1.2 pu. During this process, the state of charge (SOC) of the battery experienced an increase from 60% to 63%. A graph (1502) indicates HVDC link voltage, a graph (1504) indicates a state of charge of battery, a graph (1506) indicates the real power, and a graph (1508) indicates the PCC voltage.

Figure 16:
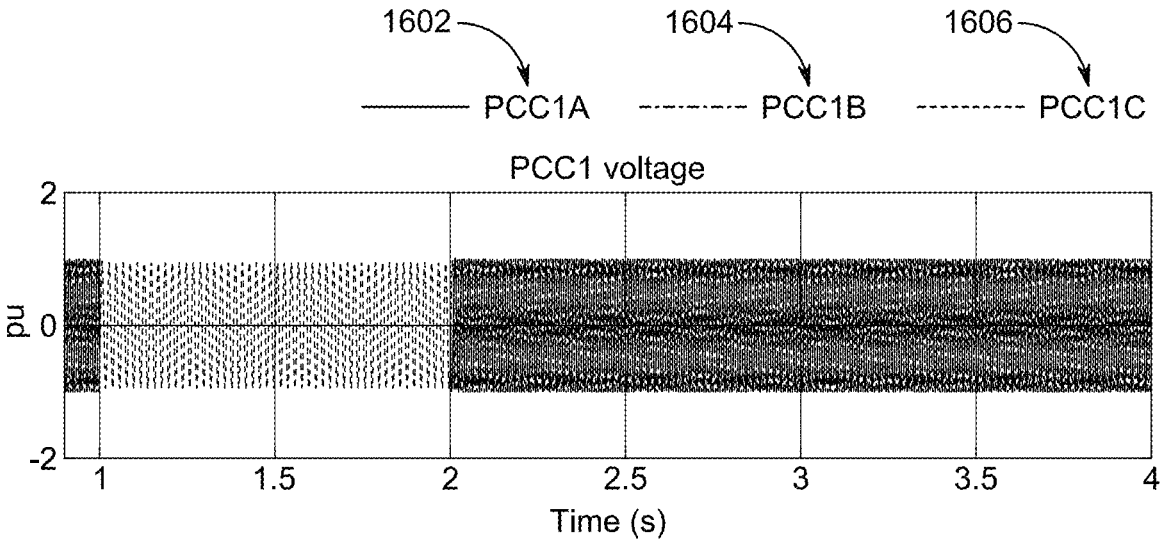
FIG. 16 is a graphical representation of PCC1 voltage for the duration of the low-voltage LLG fault, according to certain embodiments.

Additionally, a line-to-line-ground (LLG) fault, akin to the previously mentioned LLLG fault, was also simulated at PCC1 for a duration of one second, as showcased in FIG. 16. FIG. 16 is a graphical representation of PCC1 voltage for the duration of the low-voltage LLG fault, in accordance with one embodiment. A graph (1602) indicates response of PCC1A, a graph (1604) indicates response of PCC1B, and a graph (1606) indicates response of PCC1C for the duration of the low-voltage LLG fault.

Figure 17:
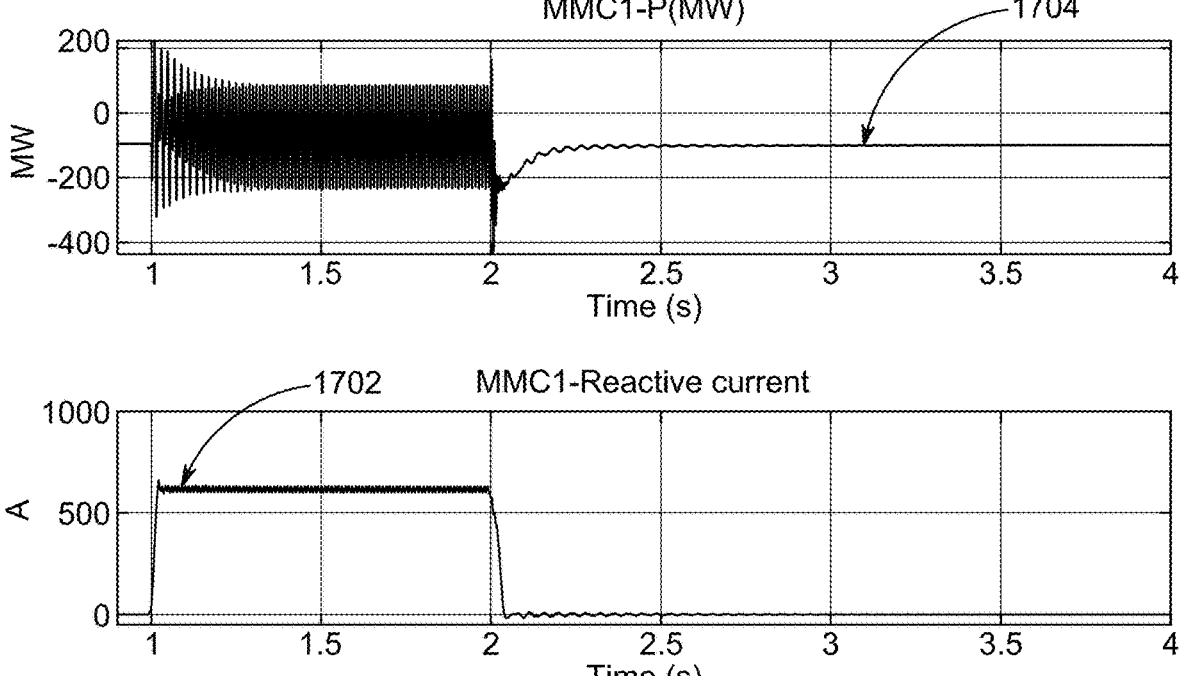
FIG. 17 is a graphical representation of real power and reactive current of MMC1 for the interval of LLG fault, according to certain embodiments.

FIG. 17 is a graphical representation of real power and reactive current of MMC1 for the interval of LLG fault, in accordance with one embodiment. During low-voltage LLLG and LLG faults at PCC1, the MMC1 injected approximately 600 A reactive current. A graph (1702) indicates response of MMC-1 reactive current, and a graph (1704) indicates response of MMC-1-P (MW).

Figure 18:
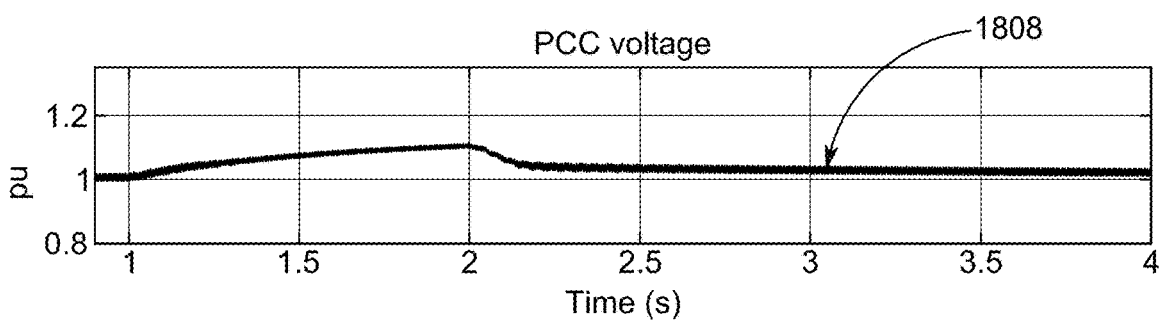
FIG. 18 is a graphical representation of the stability achieved by proportionally charging the battery system to elevate the voltage at PCC when the reactive current is 600 A, according to certain embodiments.
Figure 18:
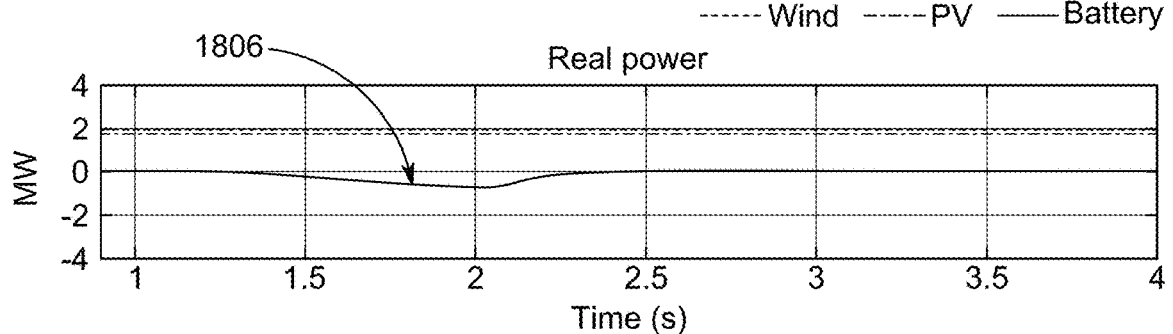
Figure 18:
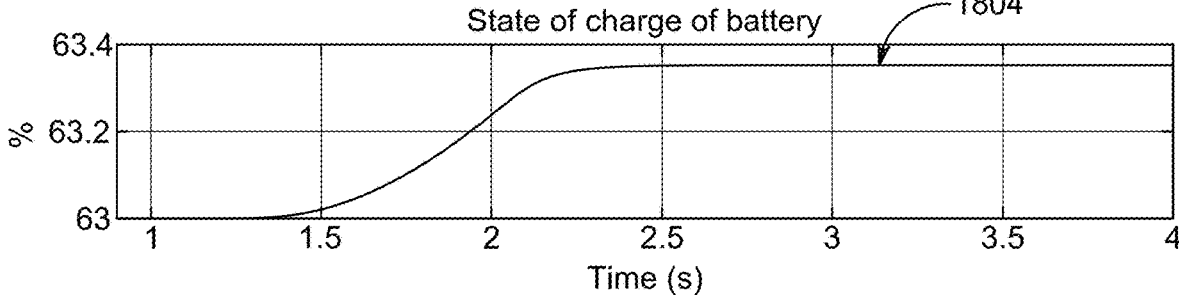
Figure 18:
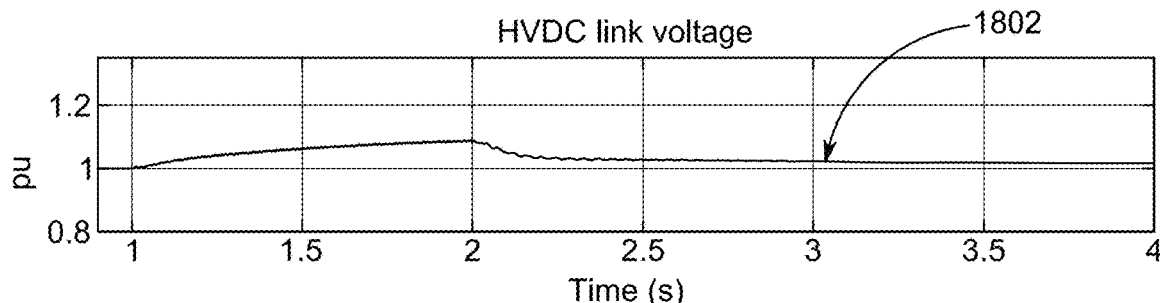

FIG. 18 is a graphical representation of the stability achieved by proportionally charging the battery system to elevate the voltage at PCC when the reactive current is 600 A, in accordance with one embodiment. FIG. 18 represents PCC voltage, real power change of wind, PV, and battery source, battery SOC, and HVDC-link voltage throughout the LLLG fault when the reactive current is 600 A. A graph (1802) indicates HVDC link voltage, a graph (1804) indicates a state of charge of battery, a graph (1806) indicates the real power, and a graph (1808) indicates the PCC voltage.

The invention claimed is:

1. An energy management system for a high-voltage direct current (HVDC) transmission network, comprising:
a HVDC transmission line having a first end, a second end, and a HVDC voltage;
a first modular multilevel converter (MMC) having a first MMC voltage connected to the first end of the HVDC transmission line;
a first AC grid having a first point of common coupling (PCC) connected to the first MMC, wherein the first PCC has a first PCC voltage;
a second MMC having a second MMC voltage connected to the second end of the HVDC transmission line; and
a second AC grid having a second PCC connected to the second MMC, wherein the second AC grid comprising at least one solar photovoltaic system, at least one wind farm system, and a battery energy storage system comprising a battery and a battery controller, and wherein the second PCC having a second PCC voltage;
wherein the battery controller is configured to sense a voltage disturbance of the energy management system and to switch a control mode between a normal operating mode and an excess energy control mode,
wherein the battery controller is configured to operate in the excess energy control mode during a three-phase-to-ground low-voltage fault at the first PCC by executing an energy control strategy, the energy control strategy comprising:
changing the second MMC voltage from constant to variable, wherein a variable second MMC voltage is proportional to the HVDC voltage in response to the three-phase-to-ground low-voltage fault, wherein the three-phase-to-ground low-voltage fault causes the HVDC voltage to increase above a HVDC threshold voltage;
signaling the battery controller by increasing the second PCC voltage in response to an increased second MMC voltage to switch the battery energy storage system from a discharging mode to a charging mode; and
delivering an energy from the solar photovoltaic system and the wind farm system to the battery energy storage system to regulate HVDC voltage below the HVDC threshold voltage.

2. The energy management system of claim 1, wherein the HVDC voltage is greater than the HVDC threshold voltage and the variable second MMC voltage is a half of the HVDC voltage.

3. The energy management system of claim 2, wherein the HVDC threshold voltage is about 1.05 pu.

4. The energy management system of claim 1, wherein the first MMC and the second MMC each comprises an inner current loop and an outer current loop; wherein a first inner current loop of the first MMC is identical to a second inner current loop of the second MMC.

5. The energy management system of claim 4, wherein the first and second inner control loop is configured to produce a modulating signal according to the battery controller.

6. The energy management system of claim 1, wherein the energy management system excludes a dynamic breaking resistor.

7. A method to control excess energy in an HVDC network, wherein the HVDC network comprises a HVDC transmission line having a first end, a second end, and a HVDC voltage, a first MMC having a first MMC voltage connected to the first end of the HVDC transmission line, a first AC grid having a first PCC connected to the first MMC, wherein the first PCC has a first PCC voltage, a second MMC configured to regulate the HVDC voltage and connected having a second MMC voltage to the second end of the HVDC transmission line, and a second AC grid having a second PCC connected to the second MMC, wherein the second AC grid comprising at least one solar photovoltaic system, at least one wind farm system, a battery energy storage system comprising a battery and a battery controller, and a second PCC having a second PCC voltage, comprising:

sensing a voltage disturbance at the first PCC to determine a three-phase-to-ground low-voltage fault;

changing the second MMC voltage from constant to variable, wherein a variable second MMC voltage is proportional to the HVDC voltage in response to the three-phase-to-ground low-voltage fault, wherein the three-phase-to-ground low-voltage fault causes the HVDC voltage to increase above a HVDC threshold voltage;

signaling the battery controller by increasing the second PCC voltage in response to an increased second MMC voltage to switch the battery energy storage system from a discharging mode to a charging mode; and delivering an energy from the solar photovoltaic system and the wind farm system to the battery energy storage system to regulate HVDC voltage below the HVDC threshold voltage.

8. The method of claim 7, wherein the HVDC voltage is greater than the HVDC threshold voltage and the variable second MMC voltage is a half of the HVDC voltage.

9. The method of claim 8, wherein the HVDC threshold voltage is about 1.05 pu.

10. The method of claim 7, wherein the first MMC and the second MMC each comprises an inner current loop and an outer current loop; wherein a first inner current loop of the first MMC is identical to a second inner current loop of the second MMC.

11. The method of claim 10, wherein the first and second inner control loop is configured to produce a modulating signal according to the battery controller.

12. The method of claim 7, wherein the HVDC network excludes a dynamic breaking resistor.

\* \* \* \* \*